United States Patent
Chikamoto et al.

(10) Patent No.: US 10,259,240 B2
(45) Date of Patent: Apr. 16, 2019

(54) SHEET TRAY AND IMAGE FORMING APPARATUS

(71) Applicant: BROTHER KOGYO KABUSHIKI KAISHA, Nagoya-shi, Aichi-ken (JP)

(72) Inventors: Tadanobu Chikamoto, Nagoya (JP); Yasuo Nishikawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/860,880

(22) Filed: Jan. 3, 2018

(65) Prior Publication Data

US 2018/0201036 A1    Jul. 19, 2018

(30) Foreign Application Priority Data

Jan. 13, 2017    (JP) ................. 2017-004469

(51) Int. Cl.

| | |
|---|---|
| *B41J 13/10* | (2006.01) |
| *B65H 1/04* | (2006.01) |
| *B65H 5/36* | (2006.01) |
| *B65H 31/22* | (2006.01) |
| *H04N 1/60* | (2006.01) |
| *B65H 31/26* | (2006.01) |
| *B65H 1/02* | (2006.01) |

(52) U.S. Cl.
CPC .............. *B41J 13/103* (2013.01); *B65H 1/02* (2013.01); *B65H 1/04* (2013.01); *B65H 5/36* (2013.01); *B65H 31/22* (2013.01); *B65H 31/26* (2013.01); *H04N 1/6011* (2013.01); *B65H 2402/5151* (2013.01); *B65H 2511/12* (2013.01); *B65H 2511/22* (2013.01)

(58) Field of Classification Search
CPC ....................................................... B41J 13/103
USPC ......................................................... 358/1.1
See application file for complete search history.

(56) References Cited

FOREIGN PATENT DOCUMENTS

JP    2013-103812 A    5/2013

*Primary Examiner* — King Y Poon
*Assistant Examiner* — Michael L Burleson
(74) *Attorney, Agent, or Firm* — Merchant & Gould P.C.

(57) ABSTRACT

A sheet tray includes: a tray body; first and second guides slidable on the tray body and contactable with a sheet; an interlocking mechanism; and a plate including first and second plate engaging portions. The first guide includes a first guide engagement portion and a first operation portion. The second guide includes a second guide engagement portion and a second operation portion. When the first operation portion and the second operation portion are located at non-operated positions, the plate is located at a first position where the first and second plate engaging portions are respectively engaged with the first and second guide engagement portions. When the first operation portion and/or the second operation portion is located at an operated position, the plate is located at a second position where the first and second plate engaging portions are respectively spaced apart from the first and second guide engagement portions.

13 Claims, 15 Drawing Sheets

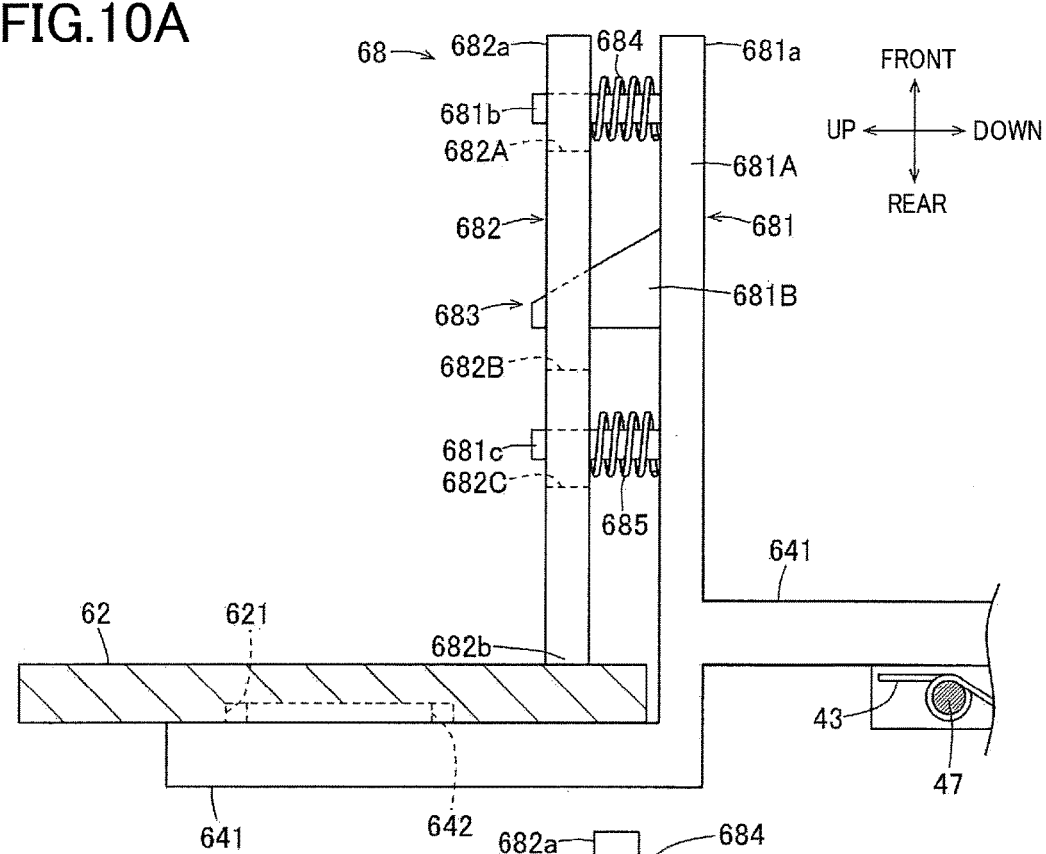
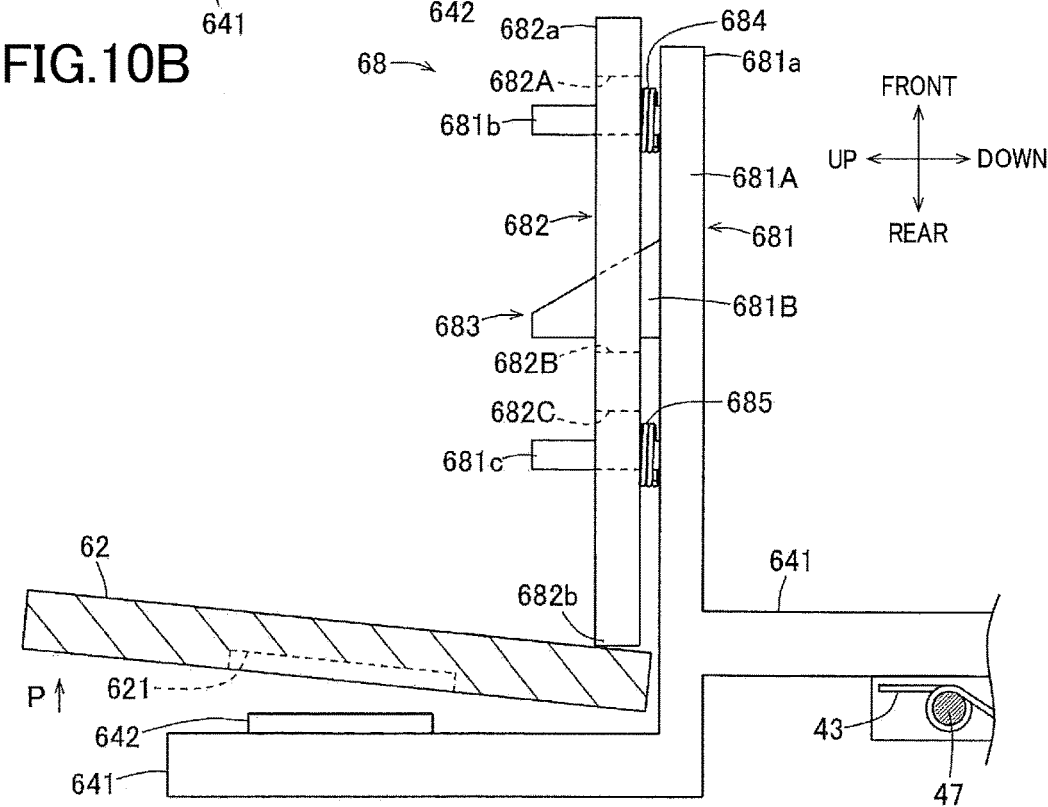

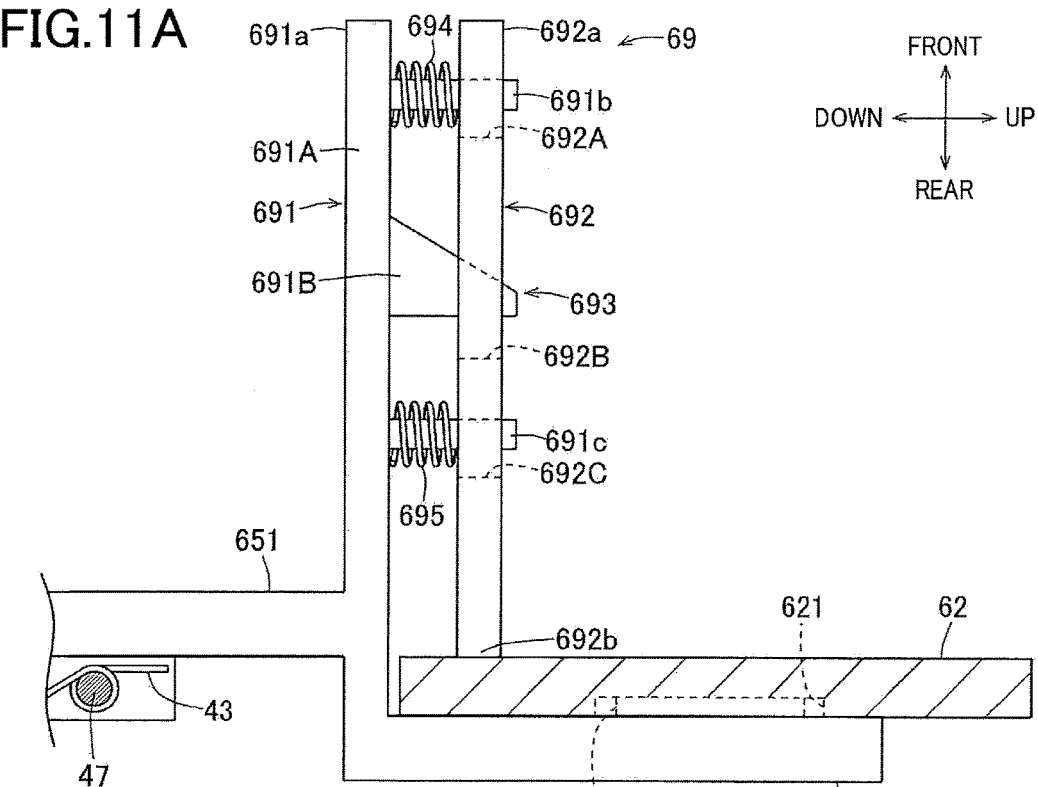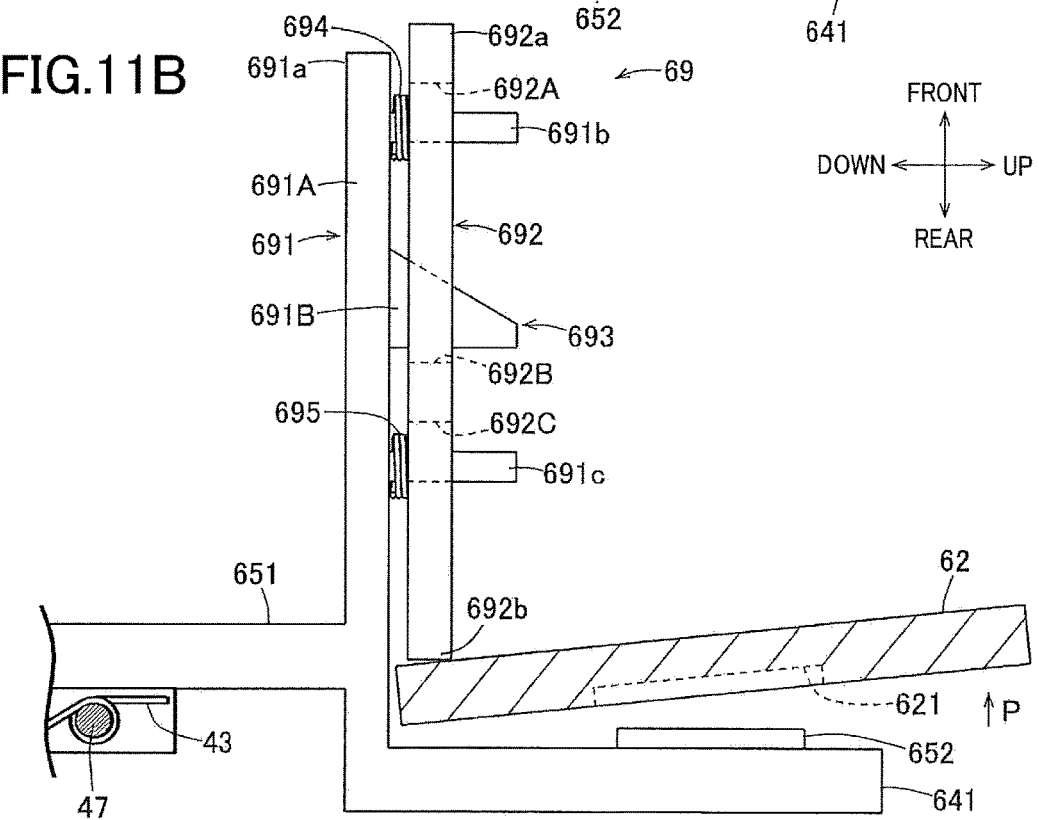

SHEET TRAY AND IMAGE FORMING APPARATUS

CROSS REFERENCE TO RELATED APPLICATION

The present application claims priority from Japanese Patent Application No. 2017-004469, which was filed on Jan. 13, 2017, the disclosure of which is herein incorporated by reference in its entirety.

BACKGROUND

The following disclosure relates to a sheet tray configured to support and position a sheet and to an image forming apparatus including the sheet tray.

A sheet tray is conventionally mounted on an image forming apparatus such as a copier and a printer. The sheet tray supports a sheet to be supplied to an image forming device configured to form an image. Examples of the sheet tray include: a cassette tray accommodatable in the image forming apparatus; and a plate-like tray mounted on a side surface of the image forming apparatus so as to extend obliquely. The sheet tray is provided with at least one guide for positioning the sheet in accordance with the size of the sheet.

One example of the at least one guide is a pair of right and left side guides configured to determine the sheet in a widthwise direction. Common side guides are slid toward and away from each other by racks and a pinion gear. Thus, when one of the side guides is slid in one direction, the other side guide is slid in the other direction in conjunction with the movement of the one sheet guide. The one side guide has a protrusion at its lower portion. When the protrusion is engaged with one of grooves formed in the sheet tray, the one side guide is positioned.

To disengage the protrusion and the groove, the one side guide is provided with an operation portion shaped like a knob. A user slides the side guide while holding the operation portion. It is assumed that the operation portion is principally operated with a right hand, and the operation portion is usually provided on a right side guide viewed from the user operating the image forming apparatus, making it difficult for a left-handed user to operate the operation portion.

To solve this problem, in a conventional image forming apparatus, a lock member constituted by a protrusion and an operation portion formed integrally is detachably attached to one of right and left side guides, and this lock member is attachable to any of the side guides. Thus, a user can attach the lock member to a desired one of the side guides, depending upon his or her dominant hand.

SUMMARY

However, this configuration requires reattachment of the lock member each time when the image forming apparatus is used by the user different in a dominant hand from the preceding user, resulting in inconvenience to the user. Furthermore, there is a possibility of a loss of the detached lock member.

Accordingly, an aspect of the disclosure relates to a sheet tray provided with a pair of interlocked guides that are slidable by an operation an operation portion of one of the guides, and relates to an image forming apparatus including the sheet tray.

In one aspect of the disclosure, a sheet tray, comprising: a tray body configured to support a sheet; a first guide provided on the tray body so as to be slidable in a widthwise direction orthogonal to a sheet conveying direction in which the sheet is to be conveyed, the first guide being contactable with a first edge portion of the sheet in the widthwise direction to position the sheet; a second guide provided on the tray body so as to be slidable in the widthwise direction and contactable with a second edge portion of the sheet in the widthwise direction to position the sheet; an interlocking mechanism configured to interlock sliding operations of the first guide and the second guide; and a plate movably supported by the tray body and comprising (i) a first plate engaging portion to be engaged with the first guide and (ii) a second plate engaging portion to be engaged with the second guide, wherein the first guide comprises: a first guide engagement portion to be engaged with the first plate engaging portion; and a first operation portion configured to move the plate, wherein the second guide comprises: a second guide engagement portion to be engaged with the second plate engaging portion; and a second operation portion configured to move the plate, wherein when each of the first operation portion and the second operation portion is located at a non-operated position, the plate is located at a first position at which the first plate engaging portion is engaged with the first guide engagement portion, and the second plate engaging portion is engaged with the second guide engagement portion, and wherein when at least one of the first operation portion and the second operation portion is located at an operated position, the plate is located at a second position at which the first plate engaging portion is spaced apart from the first guide engagement portion, and the second plate engaging portion is spaced apart from the second guide engagement portion.

In another aspect of the disclosure, an image forming apparatus, comprising: a sheet tray; and an image forming device configured to form an image on a sheet, wherein the sheet tray comprises: a tray body configured to support the sheet; a first guide provided on the tray body so as to be slidable in a widthwise direction orthogonal to a sheet conveying direction in which the sheet is to be conveyed, the first guide being contactable with a first edge portion of the sheet in the widthwise direction to position the sheet; a second guide provided on the tray body so as to be slidable in the widthwise direction and contactable with a second edge portion of the sheet in the widthwise direction to position the sheet; an interlocking mechanism configured to interlock sliding operations of the first guide and the second guide; and a plate movably supported by the tray body and comprising (i) a first plate engaging portion to be engaged with the first guide and (ii) a second plate engaging portion to be engaged with the second guide, wherein the first guide comprises: a first guide engagement portion to be engaged with the first plate engaging portion; and a first operation portion configured to move the plate, wherein the second guide comprises: a second guide engagement portion to be engaged with the second plate engaging portion; and a second operation portion configured to move the plate, wherein when each of the first operation portion and the second operation portion is located at a non-operated position, the plate is located at a first position at which the first plate engaging portion is engaged with the first guide engagement portion, and the second plate engaging portion is engaged with the second guide engagement portion, and wherein when at least one of the first operation portion and the second operation portion is located at an operated position, the plate is located at a second position at which the first plate engaging portion is spaced apart from the first guide engagement portion, and the second plate engaging portion is spaced apart from the second guide engagement portion.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIGS. 4A and 4B are enlarged cross-sectional views taken along line A-A in FIG. 2, wherein FIG. 4A illustrates a state in which a first operation portion is located at a non-operated position, and FIG. 4B illustrates a state in which a first operation portion is located at an operated position;

FIGS. 5A and 5B are enlarged cross-sectional views taken along line B-B in FIG. 2, wherein FIG. 5A illustrates a state in which a second operation portion is located at a non-operated position, and FIG. 5B illustrates a state in which a second operation portion is located at an operated position;

FIGS. 7A and 7B are enlarged cross-sectional views taken along line C-C in FIG. 6, wherein FIG. 7A illustrates a state in which a first operation portion is located at a non-operated position, and FIG. 7B illustrates a state in which a first operation portion is located at an operated position;

FIGS. 8A and 8B are enlarged cross-sectional views taken along line D-D in FIG. 6, wherein FIG. 8A illustrates a state in which a second operation portion is located at a non-operated position, and FIG. 8B illustrates a state in which a second operation portion is located at an operated position;

FIGS. 10A and 10B are enlarged cross-sectional views taken along line E-E in FIG. 9, wherein FIG. 10A illustrates a state in which a first operation portion is located at a non-operated position, and FIG. 10B illustrates a state in which a first operation portion is located at an operated position;

FIGS. 11A and 11B are enlarged cross-sectional views taken along line F-F in FIG. 9, wherein FIG. 11A illustrates a state in which a second operation portion is located at a non-operated position, and FIG. 11B illustrates a state in which a second operation portion is located at an operated position;

DETAILED DESCRIPTION OF THE EMBODIMENTS

Hereinafter, there will be described embodiments by reference to the drawings. An image forming apparatus includes an image forming device configured to form an image on a sheet. For example, the image forming apparatus is a printer such as an ink-jet printer, a laser printer, and a thermal printer. The image forming apparatus may be a multi-function peripheral (MFP) having a printing function, a copying function, a scanning function, and a facsimile function.

Overall Configuration of Image Forming Apparatus

Figure 1:
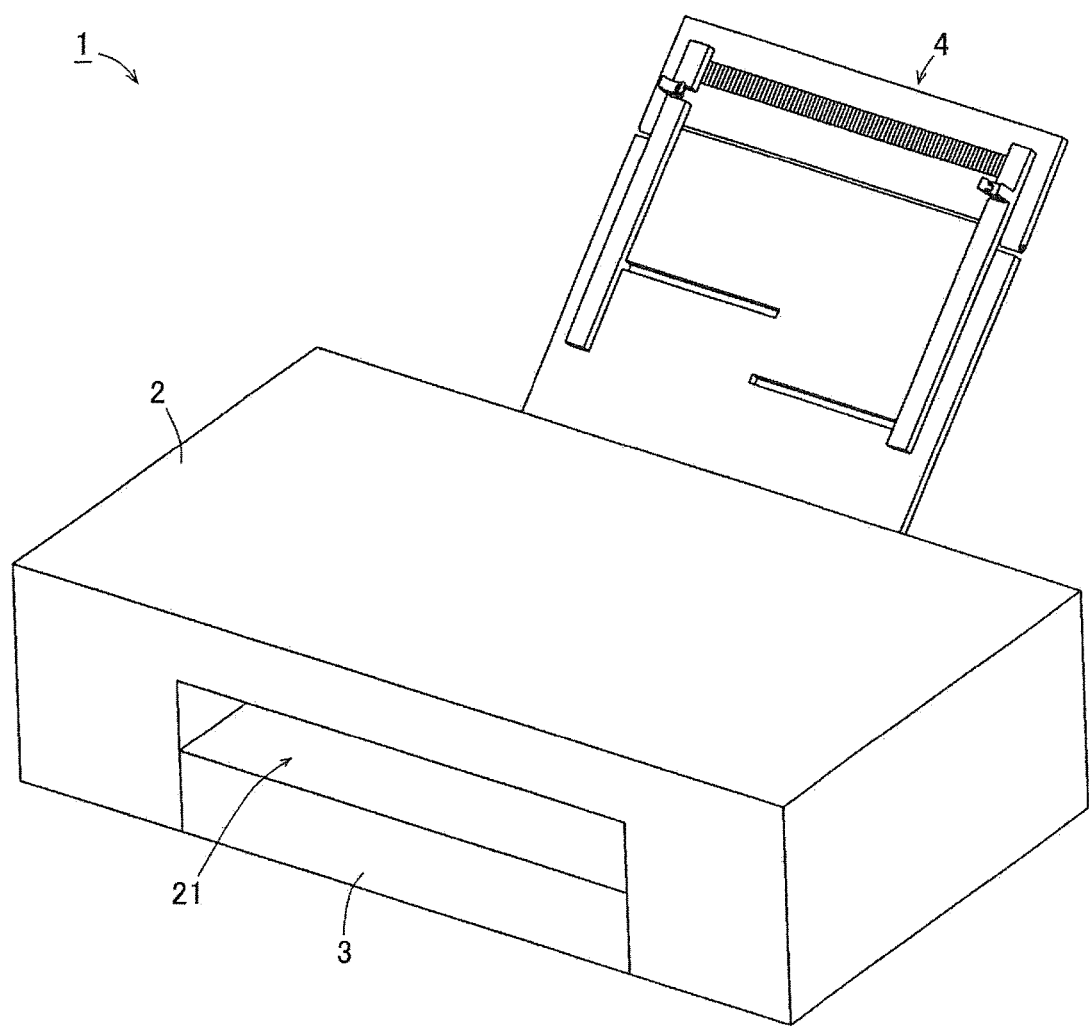
FIG. 1 is a simplified perspective view of an image forming apparatus according to one embodiment.

FIG. 1 illustrates an image forming apparatus 1 according to one embodiment. The image forming apparatus 1 includes an apparatus body 2, a sheet cassette 3, and a sheet tray 4. The apparatus body 2 has a rectangular parallelepiped shape in FIG. 1 for simplicity. The apparatus body 2 contains an image forming device, not illustrated, configured to form an image on a sheet supplied from the sheet cassette 3 or the sheet tray 4 and convey the image-formed sheet to an output opening 21.

The sheet cassette 3 is a box capable of storing one or more sheets for image forming, e.g., blank sheets. The sheet cassette 3 is accommodated in a lower portion of the apparatus body 2 so as to be drawable frontward. The sheet tray 4 supports one or more sheets for image forming and is mounted on a rear surface of the apparatus body 2 in an inclined state. Each sheet supported on the sheet tray 4 is conveyed frontward into the apparatus body 2, with a lower edge of the sheet serving as a leading edge.

There will be next explained the sheet trays 4 according to first through sixth embodiments.

First Embodiment

Figure 2:
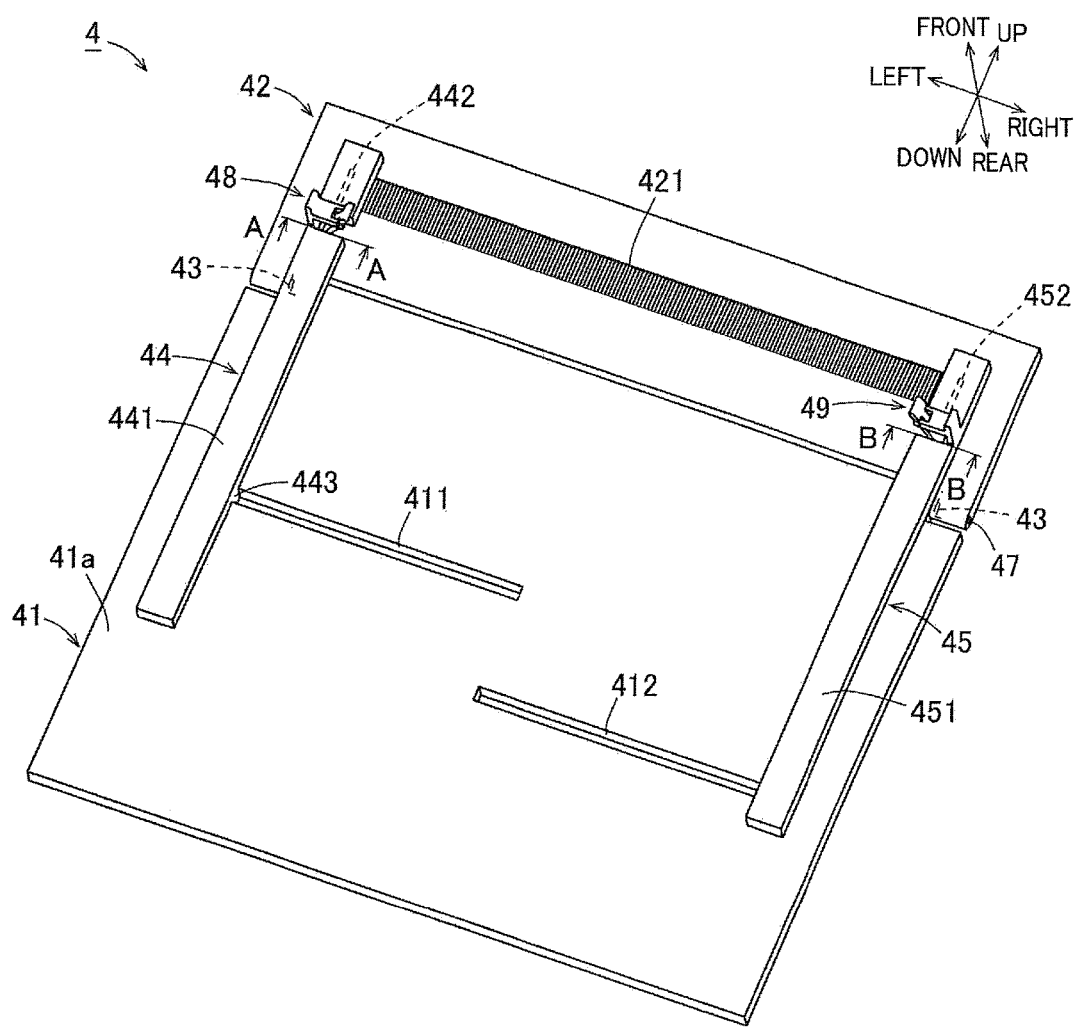
FIG. 2 is a perspective view of a sheet tray according to the first embodiment, illustrating a front side thereof.

In the following description, directions and sides are defined in a state in which the sheet tray 4 is placed usably as illustrated in FIG. 1. Specifically, the right and left direction is defined in a state in which the sheet tray 4 is viewed from a front side thereof. The up and down direction is directed along a line connecting between upper and lower ends of the sheet tray 4. One of opposite surfaces of the sheet tray 4 along the front surface of the sheet of FIG. 2 is defined as a front surface of the sheet tray 4, and the other surface is defined as a rear surface of the sheet tray 4. The front and rear direction is directed along a line normal to the front and rear surfaces of the sheet tray 4.

The sheet tray 4 includes a tray body 41, a plate 42, urging members 43, a first guide 44, a second guide 45, and an interlocking mechanism 46.

The tray body 41 is shaped like a substantially rectangular plate. A front surface of the tray body 41 serves as a support surface 41a capable of supporting the sheet. The tray body 41 has a first guide hole 411 and a second guide hole 412. The first guide hole 411 is an elongated hole extending through the tray body 41 from the support surface 41a to a rear surface of the tray body 41 and extending straight in the right and left direction. The first guide 44 is fitted in and guided by the first guide hole 411 in the right and left direction. The second guide hole 412 is an elongated hole extending through the tray body 41 from the support surface 41a to the rear surface of the tray body 41 and extending straight in the right and left direction. The first guide hole 411 and the second guide hole 412 are different from each other in positions in the up and down direction and the right and left direction. The second guide 45 is fitted in and guided by the second guide hole 412 in the right and left direction.

The plate 42 is a substantially rectangular plate coupled to an upper end portion of the tray body 41. A front surface of the plate 42 is flush with the support surface 41a of the tray body 41 and supports the sheet with the support surface 41a.

The plate 42 is movably supported by the tray body 41. Specifically, the plate 42 and the tray body 41 are coupled to each other by hinges 47 as one example of a third hinge mechanism. Each of the hinges 47 is constituted by (i) a pin provided on one of the plate 42 and the tray body 41 and (ii) a hole formed in the other of the plate 42 and the tray body 41, for example. The plate 42 is pivotable in the front and rear direction about the hinges 47. The configuration using the hinges 47 for moving the plate 42 facilitates designing.

The urging members 43 are attached to the respective hinges 47. The urging members 43 urge the plate 42 in the front direction. Each of the urging members 43 may be formed of any urging material such as a spring and rubber. In the present embodiment, the urging member 43 is a torsion coil spring. Use of the urging members 43 enables the plate 42 to be urged in the front direction with a simple configuration.

The front surface of the plate 42 has engagement grooves 421 as one example of a first plate engaging portion for engagement with the first guide 44 and as one example of a second plate engaging portion for engagement with the second guide 45. The engagement grooves 421 each extending in the up and down direction are arranged in the right and left direction. It is noted that engagement grooves as the first plate engaging portion for engagement with the first guide 44 and engagement grooves as the second plate engaging portion for engagement with the second guide 45 may be formed independently of each other. It is further noted that holes or protrusions may be used instead of the engagement grooves 421.

The first guide 44 is provided on the tray body 41 so as to be slidable in the widthwise direction orthogonal to a sheet conveying direction in which the sheet is conveyed. The first guide 44 is brought into contact with one edge of the sheet or sheets in the widthwise direction to position the sheet or sheets to a predetermined position. In the present embodiment, the first guide 44 is slidable in the right and left direction and brought into contact with a left edge of the sheet or sheets. In the case of a plurality of the sheets, the first guide 44 aligns the sheets.

The first guide 44 includes a first guide portion 441, a first guide engagement portion 442, a first connecting portion 443, a first rack portion 444, and a first operation portion 48 which are formed integrally with each other.

The first guide portion 441 is brought into contact with the one edge of the sheet or sheets in the widthwise direction to position the sheet or sheets to the predetermined position. In the present embodiment, the first guide portion 441 is shaped like a bar extending in the up and down direction along the support surface 41a of the tray body 41 and the front surface of the plate 42. The first guide engagement portion 442 is a protrusion formed near an upper end of a rear surface of the first guide portion 441 and engageable with any of the engagement grooves 421. When the first guide engagement portion 442 is held in engagement with one of the engagement grooves 421, the first guide 44 is positioned.

The first connecting portion 443 is a protrusion connecting the first guide portion 441 and the first rack portion 444 to each other. The first connecting portion 443 is fitted in the first guide hole 411 and guided in the right and left direction along the first guide hole 411. With this configuration, the first guide 44 is movable in the right and left direction.

Figure 3:
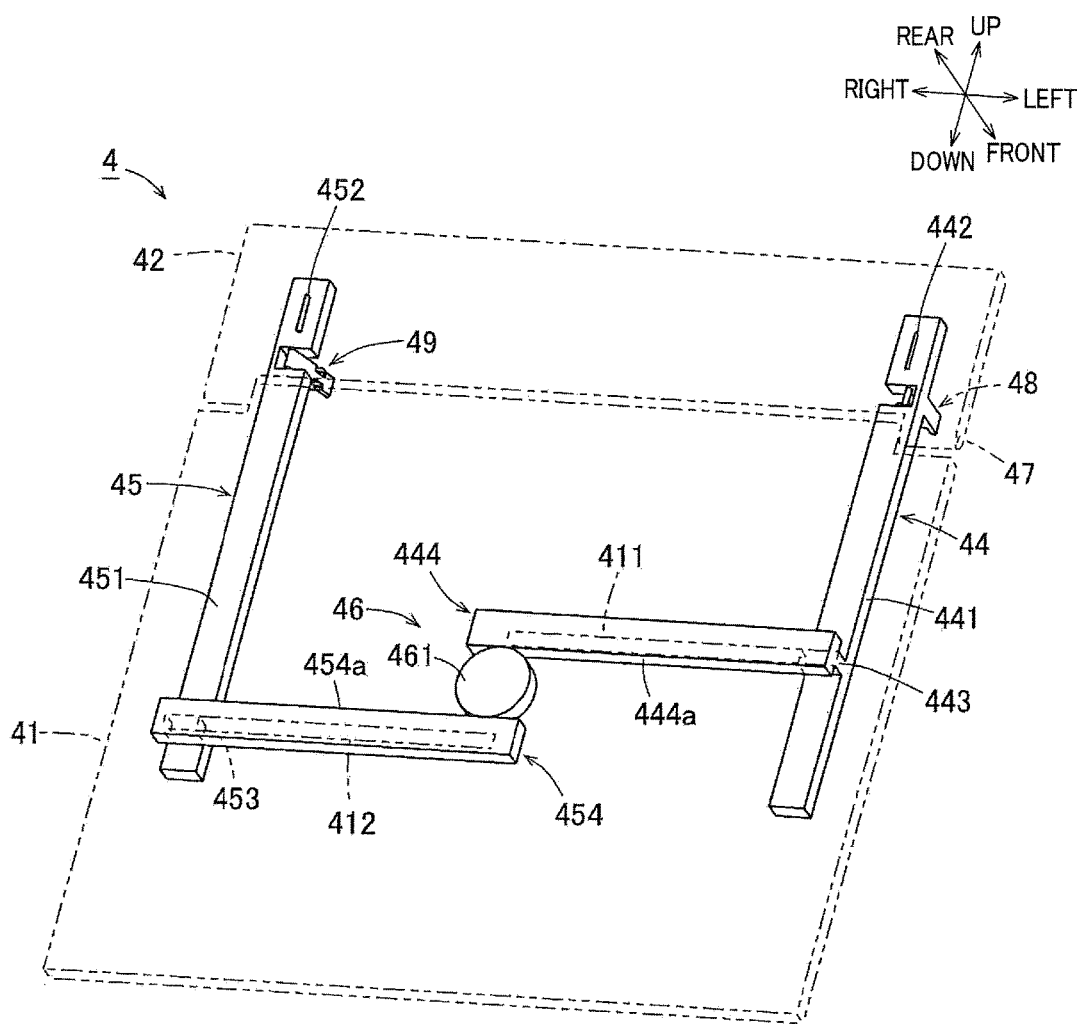
FIG. 3 is a perspective view of the sheet tray according to the first embodiment, illustrating a rear side thereof.

As illustrated in FIG. 3, the first rack portion 444 is shaped like a bar extending in the right and left direction along the rear surface of the tray body 41. The first rack portion 444 partly constitutes the interlocking mechanism 46. A first rack gear 444a engageable with a pinion gear 461 is formed on a lower end portion of the first rack portion 444. It is noted that FIG. 3 omits illustration of teeth of the pinion gear 461 and the first rack gear 444a for simplicity.

Figure 4A:
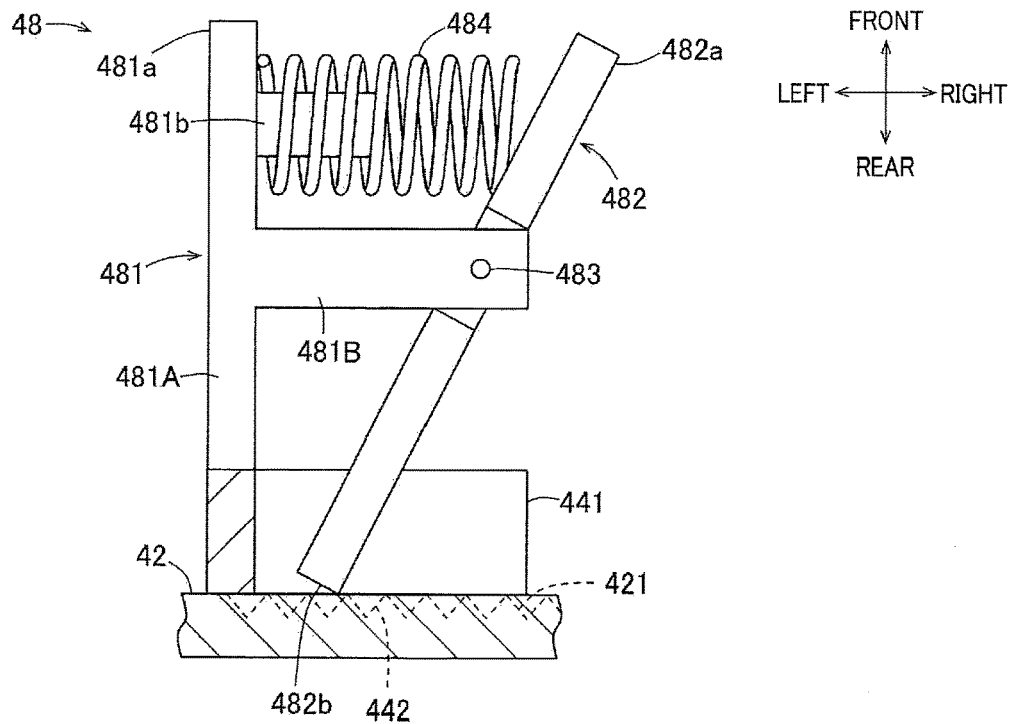
Figure 4B:
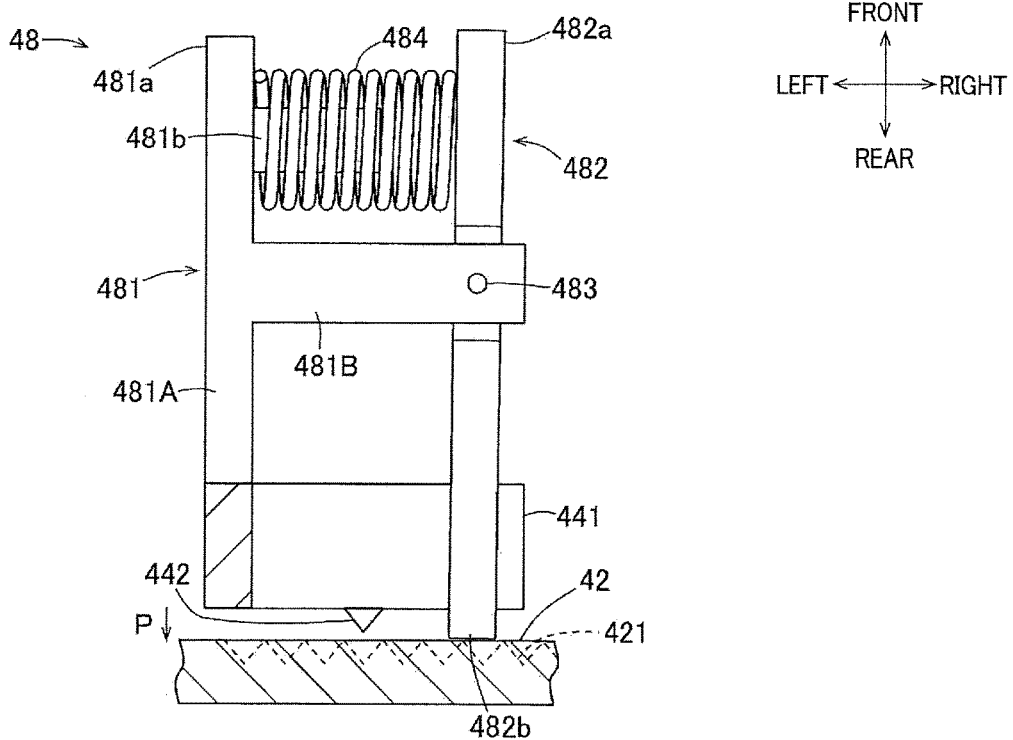

The first operation portion 48 is for moving the plate 42. In the present embodiment, the first operation portion 48 is for pushing the front surface of the plate 42 so as to turn the plate 42 in the rear direction. FIG. 4A illustrates the first operation portion 48 located at a non-operated position. FIG. 4B illustrates the first operation portion 48 located at an operated position.

The first operation portion 48 includes: a first support portion 481; a first moving portion 482 having a first guide contact portion 482b; a hinge 483 as one example of a first hinge mechanism; and an urging member 484.

The first support portion 481 includes: a first member 481A opposed to the front surface of the plate 42 and extending frontward from a front surface of the first guide portion 441; and a second member 481B extending in the right direction from a middle portion of the first member 481A. The first member 481A and the second member 481B are formed integrally with each other. A front portion of the first member 481A serves as a knob 481a for an operation of the first operation portion 48. A portion of the first guide portion 441 which is located at a rear of the second member 481B is cut out for placement of the first moving portion 482.

The first moving portion 482 is shaped like a bar and coupled to a distal end portion of the second member 481B by the hinge 483. A front portion of the first moving portion 482 serves as a knob 482a for an operation of the first operation portion 48. A rear end portion of the first moving portion 482 is the first guide contact portion 482b contactable with the front surface of the plate 42. The first guide contact portion 482b is in contact with a first plate contact portion of the plate 42. In other words, the first guide contact portion 482b is in contact with a portion of the plate 42 at a first contact position. As illustrated in FIG. 2, the first plate contact portion is located between the hinges 47 and the engagement grooves 421 in the up and down direction. This configuration makes it possible to move the plate 42 so as to disengage the engagement groove 421 and the first guide engagement portion 442 from each other, by a small amount of movement of the first guide contact portion 482b in the front and rear direction.

The hinge 483 is constituted by (i) a pin provided on one of the first moving portion 482 and the second member 481B and (ii) a hole formed in the other of the first moving portion 482 and the second member 481B, for example. The first moving portion 482 is pivotable about the hinge 483 in the right and left direction. The configuration using the hinge 483 for moving the first moving portion 482 facilitates designing.

The urging member 484 is provided between the knob 482a of the first moving portion 482 and the knob 481a of the first support portion 481. The urging member 484 urges the knob 482a of the first moving portion 482 in the right direction. The urging member 484 may be formed of any urging material such as a spring and rubber. In the present embodiment, the urging member 484 is a compression coil spring and supported by a protrusion 481b of the first member 481A. Use of the urging member 484 enables the first moving portion 482 to be urged with a simple configuration.

As illustrated in FIG. 4A, when the first operation portion 48 is located at the non-operated position, that is, when the first moving portion 482 is located at the non-operated position, the plate 42 is located at a first position at which the first guide engagement portion 442 is in engagement with one of the engagement grooves 421. In this state, the urging member 484 urges the knob 482a of the first moving portion 482 in the right direction, and thereby a force in a front right direction acts on the first guide contact portion 482b, so that no force is applied from the first guide contact portion 482b to the plate 42. Since the plate 42 is urged frontward by the urging members 43, the front surface of the plate 42 is in contact with the first guide portion 441, and the first guide engagement portion 442 is in engagement with one of the engagement grooves 421. Thus, when the first operation portion 48 is located at the non-operated position, the first guide 44 is held in engagement with the plate 42.

As illustrated in FIG. 4B, when the first operation portion 48 is located at the operated position, that is, when the first moving portion 482 is located at the operated position, the plate 42 is located at a second position at which the first guide engagement portion 442 is spaced apart from the engagement grooves 421. To move the first operation portion 48 to the operated position, a user pulls the knob 482a toward the knob 481a in a state in which the index finger of his or her left hand is placed on the knob 481a, and the thumb of the left hand is placed on the knob 482a, for example.

When the first operation portion 48 is moved from the non-operated position to the operated position, the knob 482a of the first moving portion 482 is moved in the left direction against the urging force of the urging member 484, which turns the first guide contact portion 482b in the rear right direction. In this movement, the first guide contact portion 482b pushes the front surface of the plate 42 rearward, so that the plate 42 is moved rearward as indicated by the arrow P in FIG. 4B against the urging forces of the urging members 43. This movement separates the first guide engagement portion 442 from the engagement groove 421. Thus, when the first operation portion 48 is located at the operated position, the first guide 44 and the plate 42 are disengaged from each other. At the same time, a second guide engagement portion 452 of the second guide 45 and the plate 42 are also disengaged from each other. Accordingly, the movement of the first operation portion 48 to the operated position disengages the first guide 44 and the plate 42 from each other and disengages the second guide 45 and the plate 42 from each other, and in this state the first guide 44 and the second guide 45 are movable in the right and left direction. Here, there will be explained a construction for simultaneously disengaging the first guide engagement portion 442 and the engagement groove 421 from each other and disengaging the second guide engagement portion 452 and the engagement groove 421 from each other. As illustrated in FIG. 2, the plate 42 is configured to pivot relative to the tray body 41 by the hinges 47 about a pivot axis. Since the hinges 47 are pivotably supported by the tray body 41 at a lower right end portion and a lower left end portion of the plate 42, it is considered that a direction in which the pivot axis extends coincides with a direction directed through the lower right end portion and the lower left end portion of the plate 42. In FIG. 2, it is considered that the direction in which the pivot axis extends substantially coincides with the right and left direction. In the case where the direction of the pivot axis is defined, the sheet tray 4 is configured such that the pivot axis substantially coincides with a direction of a line connecting between the position at which the first guide engagement portion 442 is engaged with the engagement groove 421 and the position at which the second guide engagement portion 452 is engaged with the engagement groove 421. This configuration of the sheet tray 4 makes it possible to simultaneously disengage the first guide engagement portion 442 and the engagement groove 421 from each other and disengage the second guide engagement portion 452 and the engagement groove 421 from each other, thereby enabling simultaneous movement of the first guide 44 and the second guide 45 in the right and left direction.

As illustrated in FIGS. 2 and 3, the second guide 45 is provided on the tray body 41 so as to be slidable in the widthwise direction. The second guide 45 is brought into contact with the other edge of the sheet or sheets in the widthwise direction to position the sheet or sheets to the predetermined position. In the present embodiment, the second guide 45 is slidable in the right and left direction and brought into contact with a right edge of the sheet or sheets. In the case of a plurality of the sheets, the second guide 45 aligns the sheets.

The second guide 45 includes a second guide portion 451, the second guide engagement portion 452, a second connecting portion 453, a second rack portion 454, and a second operation portion 49 which are formed integrally with each other.

As illustrated in FIG. 3, the second connecting portion 453 and the second rack portion 454 of the second guide 45 are located on a down side of the first connecting portion 443 and the first rack portion 444 of the first guide 44 in the up and down direction by an amount corresponding to the diameter of the pinion gear 461. A second rack gear 454a engageable with the pinion gear 461 is formed on an upper end portion of the second rack portion 454. FIG. 3 omits illustration of teeth of the second rack gear 454a for simplicity.

Figure 5A:
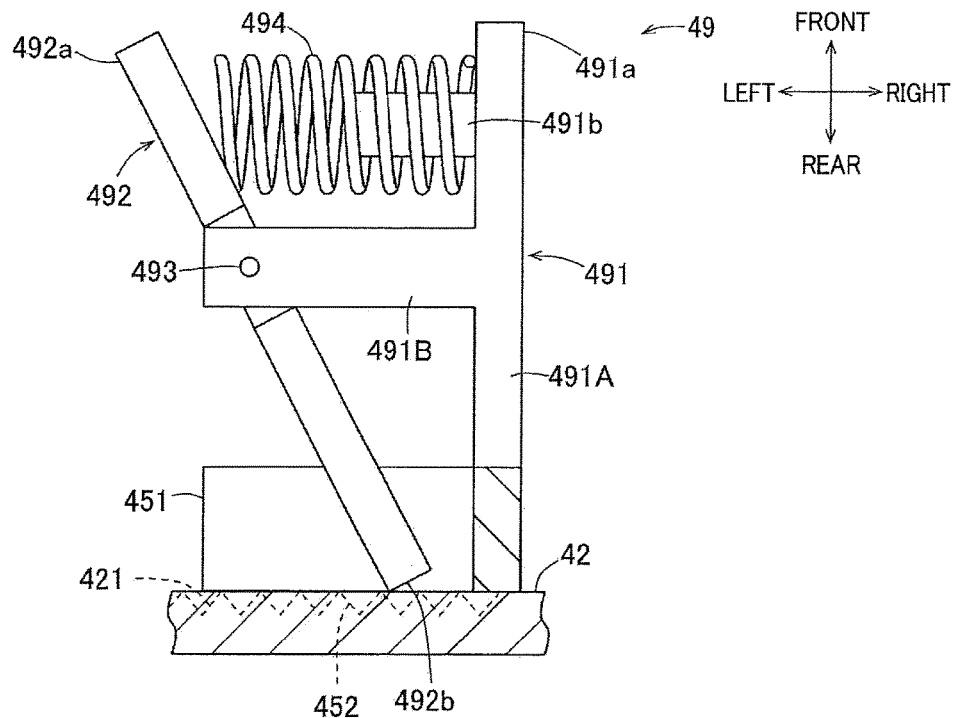
Figure 5B:
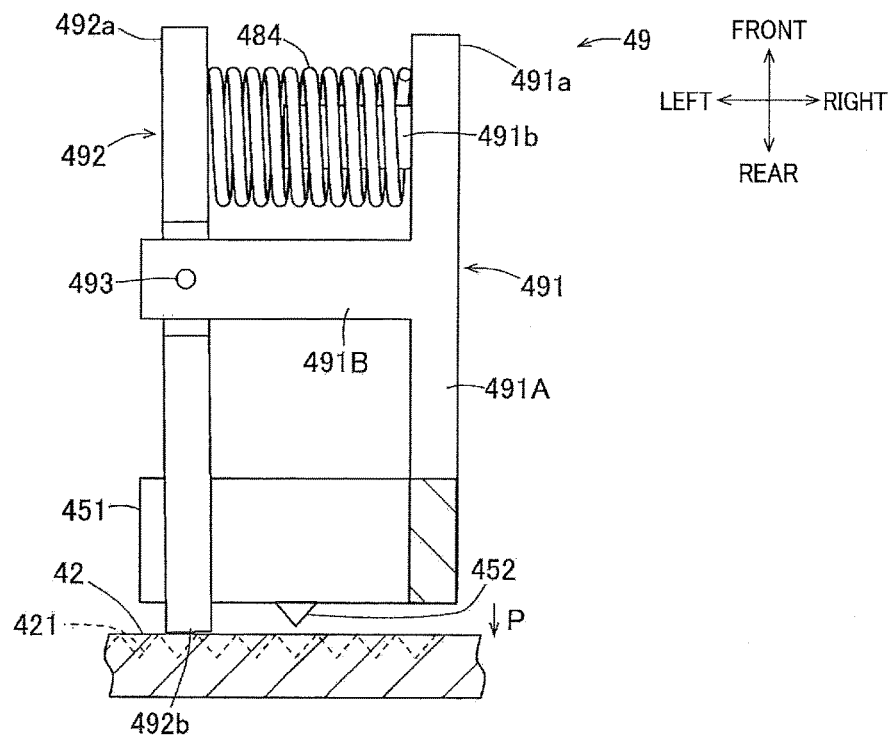

The second guide portion 451, the second guide engagement portion 452, and the second operation portion 49 of the second guide 45 in FIGS. 5A and 5B are symmetrical to the components of the first guide 44 in the right and left direction, and a detailed explanation thereof is dispensed with. FIG. 5A illustrates the second operation portion 49 located at a non-operated position. FIG. 5B illustrates the second operation portion 49 located at an operated position. It is noted that reference numerals corresponding to those of the components of the first operation portion 48 in FIGS. 4A and 4B are used for components of the second operation portion 49 in FIGS. 5A and 5B. The second operation portion 49 includes: a second support portion 491; a second moving portion 492 having a second guide contact portion 492b; a hinge 493 as one example of a second hinge mechanism; and an urging member 494. The hinge 493 is constituted by (i) a pin provided on one of the second moving portion 492 and a second member 491B of the second support portion 491 and (ii) a hole formed in the other of the second moving portion 492 and the second member 491B, for example. The second moving portion 492 is pivotable in the right and left direction about the hinge 493.

As illustrated in FIG. 5A, when the second operation portion 49 is located at the non-operated position, that is, when the second moving portion 492 is located at the non-operated position, the plate 42 is located at the first position at which the second guide engagement portion 452 is in engagement with one of the engagement grooves 421. In this state, the urging member 494 urges a knob 492a of the second moving portion 492 in the left direction, and thereby a force in a front right direction acts on the second guide contact portion 492b, so that no force is applied from the second guide contact portion 492b to the plate 42. Since the plate 42 is urged frontward by the urging members 43, the front surface of the plate 42 is in contact with the second guide portion 451, and the second guide engagement portion 452 is in engagement with one of the engagement grooves 421. Thus, when the second operation portion 49 is located at the non-operated position, the second guide 45 is held in engagement with the plate 42.

As illustrated in FIG. 5B, when the second operation portion 49 is located at the operated position, that is, when the second moving portion 492 is located at the operated position, the plate 42 is located at the second position at which the second guide engagement portion 452 is spaced apart from the engagement grooves 421. To move the second operation portion 49 to the operated position, the user pulls the knob 492a toward a knob 491a in a state in which the index finger of his or her right hand is placed on the knob 491a, and the thumb of the right hand is placed on the knob 492a, for example.

When the second operation portion 49 is moved from the non-operated position to the operated position, the knob 492a of the second moving portion 492 is moved in the right direction against the urging force of the urging member 494, which turns the second guide contact portion 492b in the rear left direction. In this movement, the second guide contact portion 492b pushes the front surface of the plate 42 rearward, so that the plate 42 is moved rearward as indicated by the arrow P in FIG. 5B against the urging forces of the urging members 43. This movement separates the second guide engagement portion 452 from the engagement groove 421. Thus, when the second operation portion 49 is located at the operated position, the second guide 45 and the plate 42 are disengaged from each other. At the same time, the first guide engagement portion 442 of the first guide 44 and the plate 42 are also disengaged from each other. Accordingly, the movement of the second operation portion 49 to the operated position disengages the second guide 45 and the plate 42 from each other and disengages the first guide 44 and the plate 42 from each other, and in this state the second guide 45 and the first guide 44 are movable in the right and left direction.

The interlocking mechanism 46 enables interlocked sliding operations of the first guide 44 and the second guide 45. The interlocking mechanism 46 is constituted by the pinion gear 461 provided on the rear surface of the tray body 41, and the first rack portion 444 and the second rack portion 454 arranged on the rear surface of the tray body 41.

When the first rack portion 444 is moved in the right direction, as illustrated in FIG. 3, the pinion gear 461 is rotated in the counterclockwise direction when viewed from a rear side thereof. This rotation of the pinion gear 461 moves the second rack portion 454 in the left direction. When the first rack portion 444 is moved in the left direction, the pinion gear 461 is rotated in the counterclockwise direction when viewed from a front side thereof. This rotation of the pinion gear 461 moves the second rack portion 454 in the right direction. On the other hand, movement of the second rack portion 454 in the right direction moves the first rack portion 444 in the left direction, and movement of the second rack portion 454 in the left direction moves the first rack portion 444 in the right direction.

It is noted that the interlocking mechanism is not limited to a mechanism using a rack and pinion and may be a mechanism using an arm or a belt, for example.

In view of the above, when at least one of the first operation portion 48 and the second operation portion 49 is located at the operated position, the first guide 44 and the plate 42 are disengaged from each other, and the second guide 45 and the plate 42 are also disengaged from each other. Accordingly, when at least one of the first operation portion 48 and the second operation portion 49 is located at the operated position, the first guide 44 and the second guide 45 are movable in the right and left direction.

In the sheet tray 4 configured as described above, when each of the first operation portion 48 and the second operation portion 49 is located at the non-operated position, the plate 42 is located at the first position at which the first guide engagement portion 442 is in engagement with one of the engagement grooves 421, and the second guide engagement portion 452 is in engagement with one of the engagement grooves 421. On the other hand, when at least one of the first operation portion 48 and the second operation portion 49 is located at the operated position, the plate 42 is located at the second position at which the first guide engagement portion 442 is spaced apart from the engagement grooves 421, and the second guide engagement portion 452 is spaced apart from the engagement grooves 421.

With this configuration, when at least one of the first operation portion 48 and the second operation portion 49 is operated, the plate 42 engaged with the first guide 44 and the second guide 45 is moved to disengage the plate 42 and each of the first guide 44 and the second guide 45 from each other, thereby allowing the first guide 44 and the second guide 45 to move in the right and left direction. Accordingly, the user may operate any of the first operation portion 48 and the second operation portion 49 to move both of the first guide 44 and the second guide 45 to their respective desired positions, resulting in high usability.

Second Embodiment

Figure 6:
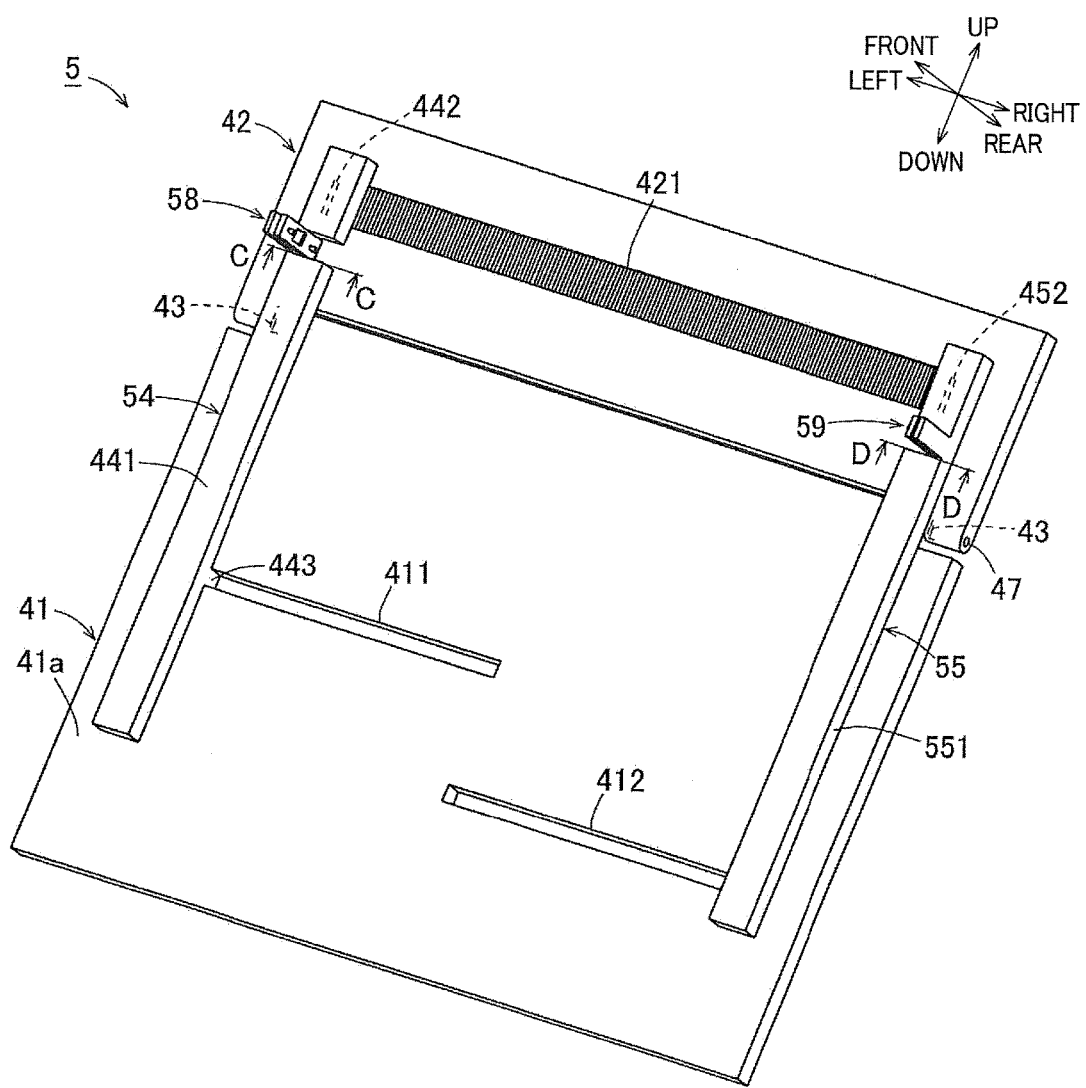
FIG. 6 is a perspective view of a sheet tray according to a second embodiment, illustrating a front side thereof.

FIG. 6 illustrates a front-side configuration of a sheet tray 5 according to a second embodiment. The rear-side configuration of the sheet tray 5 is similar to that of the sheet tray 4 according to the first embodiment (i.e., the rack and pinion), and illustration of the rear-side configuration of the sheet tray 5 is omitted. The following description is provided only for a difference between the sheet tray 5 according to the second embodiment and the sheet tray 4 according to the first embodiment. Also, the same reference numerals as used in the first embodiment are used to designate the corresponding elements of the second embodiment, and an explanation of which is dispensed with.

The sheet tray 5 includes the tray body 41, the plate 42, the urging members 43, a first guide 54, a second guide 55, and the interlocking mechanism 46.

The first guide 54 includes the first guide portion 441, the first guide engagement portion 442, the first connecting portion 443, the first rack portion 444, and a first operation portion 58 which are formed integrally with each other.

Figure 7A:
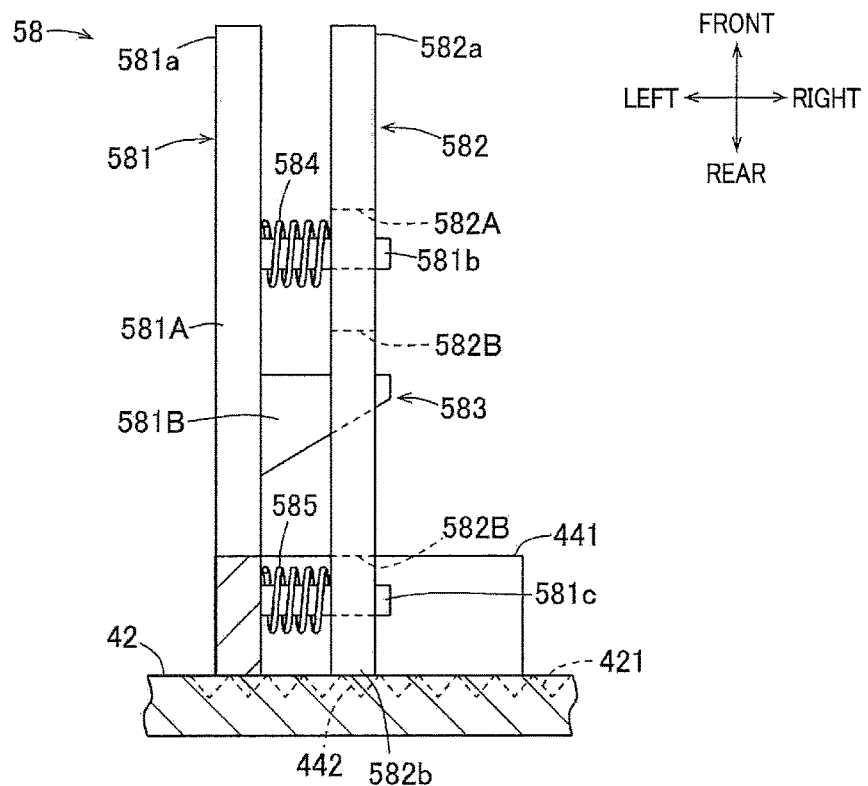
Figure 7B:
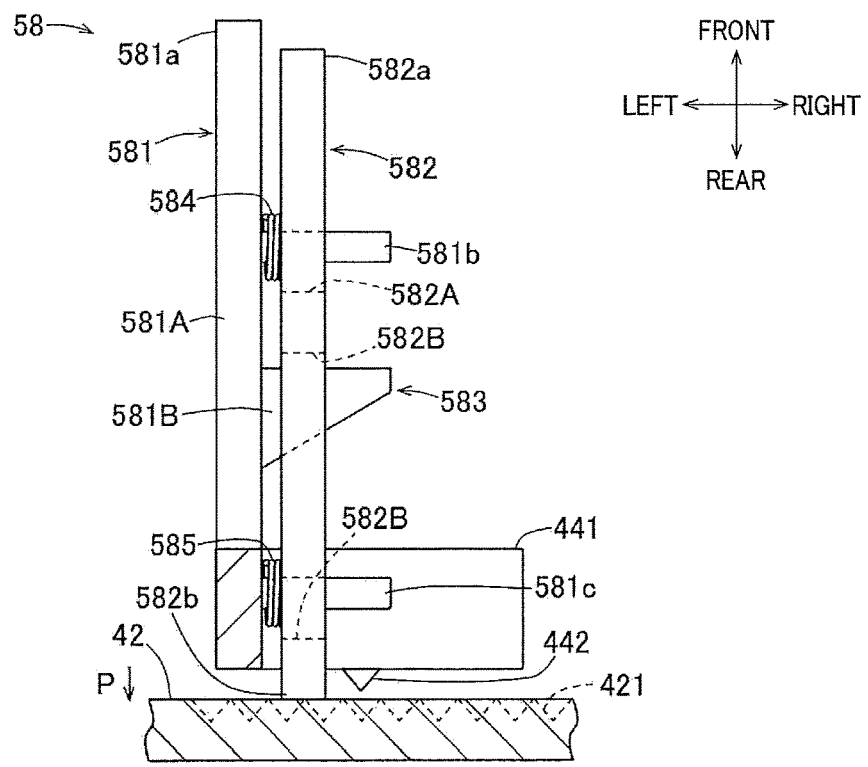

The first operation portion 58 is for moving the plate 42. In the present embodiment, the first operation portion 58 is for pushing the front surface of the plate 42 so as to turn the plate 42 in the rear direction. FIG. 7A illustrates the first operation portion 58 located at a non-operated position. FIG. 7B illustrates the first operation portion 58 located at an operated position.

The first operation portion 58 includes: a first support portion 581; a first moving portion 582 having a first guide contact portion 582b; a first sliding mechanism 583; and urging members 584, 585.

The first support portion 581 includes: a first member 581A opposed to the front surface of the plate 42 and extending frontward from the front surface of the first guide portion 441; and a second member 581B extending in the right direction from a middle portion of the first member 581A. The first member 581A and the second member 581B are formed integrally with each other. The second member 581B provided on the first member 581A is shaped like a substantially triangular prism. A rear surface of the second member 581B is inclined such that a right portion of the rear surface is located on a front side of a left portion of the rear surface. The second member 581B is one element of the first sliding mechanism 583. A front portion of the first member 581A serves as a knob 581a for an operation of the first operation portion 58. A portion of the first guide portion 441 which is located at a rear of the second member 581B is cut out for placement of the first moving portion 582.

The first moving portion 582 is shaped like a bar having three holes 582A, 582B, 582C each formed through the first moving portion 582 in the right and left direction and elongated in the front and rear direction. The hole 582B is one element of the first sliding mechanism 583. A portion of the first moving portion 582 which defines a rear end of the hole 582B is inclined along an inclined surface of the second member 581B. When the second member 581B is inserted into the hole 582B, the inclined surfaces of the portion of the first moving portion 582 and the second member 581B are slid on each other. That is, the first moving portion 582 is slidable relative to the second member 581B. Specifically, the first moving portion 582 is movable toward the first member 581A in a state in which the first moving portion 582 and the first member 581A are parallel with each other.

A front portion of the first moving portion 582 serves as a knob 582a for an operation of the first operation portion 58. A rear end portion of the first moving portion 582 is the first guide contact portion 582b contactable with the front surface of the plate 42. The first guide contact portion 582b is in contact with the first plate contact portion of the plate 42. As illustrated in FIG. 6, the first plate contact portion is located between the hinges 47 and the engagement grooves 421 in the up and down direction. This configuration makes it possible to move the plate 42 so as to disengage the engagement groove 421 and the first guide engagement portion 442 from each other, by a small amount of movement of the first guide contact portion 582b in the front and rear direction.

The first sliding mechanism 583 is constituted by the second member 581B and the hole 582B. The first moving portion 582 is slidable by the first sliding mechanism 583 in the rear left direction and the front right direction. This embodiment uses the first sliding mechanism 583 for moving the first moving portion 582, whereby a small amount of operation for moving the first moving portion 582 is enough to move the plate 42 by a sufficient amount.

The urging members 584, 585 are provided between the first moving portion 582 and the first member 581A. Each of the urging members 584, 585 urges the first moving portion 582 in the right direction. Each of the urging members 584, 585 may be formed of any urging material such as a spring and rubber. In the present embodiment, the urging members 584, 585 are compression coil springs and respectively supported by protrusions 581b, 581c of the first member 581A. The protrusions 581b, 581c are inserted in the respective holes 582A, 582C of the first moving portion 582. Use of the urging members 584, 585 enables the first moving portion 582 to be urged with a simple configuration. It is noted that at least one of the urging members 584, 585 is needed.

As illustrated in FIG. 7A, when the first operation portion 58 is located at the non-operated position, the plate 42 is located at the first position at which the first guide engagement portion 442 is in engagement with one of the engagement grooves 421. In this state, each of the urging members 584, 585 urges the first moving portion 582 in the right direction, and no force acts on the first moving portion 582 in the front and rear direction, so that no force is applied from the first guide contact portion 582b to the plate 42. Since the plate 42 is urged frontward by the urging members 43, the front surface of the plate 42 is in contact with the first guide portion 441, and the first guide engagement portion 442 is in engagement with one of the engagement grooves 421. Thus, when the first operation portion 58 is located at the non-operated position, the first guide 54 is held in engagement with the plate 42.

As illustrated in FIG. 7B, when the first operation portion 58 is located at the operated position, the plate 42 is located at the second position at which the first guide engagement portion 442 is spaced apart from the engagement grooves 421. To move the first operation portion 58 to the operated position, the user pulls the knob 582a toward the knob 581a in a state in which the index finger of his or her left hand is placed on the knob 581a, and the thumb of the left hand is placed on the knob 582a, for example.

When the first operation portion 58 is moved from the non-operated position to the operated position, the knob 582a of the first moving portion 582 is moved in the rear left direction against the urging forces of the urging members 584, 585, which moves the first guide contact portion 582b in the rear left direction. In this movement, the first guide contact portion 582b pushes the front surface of the plate 42 rearward, so that the plate 42 is moved rearward as indicated by the arrow P in FIG. 7B against the urging forces of the urging members 43. This movement separates the first guide engagement portion 442 from the engagement groove 421. Thus, when the first operation portion 58 is located at the operated position, the first guide 54 and the plate 42 are disengaged from each other. At the same time, a second guide engagement portion 552 of the second guide 55 and the plate 42 are also disengaged from each other. Accordingly, the movement of the first operation portion 58 to the operated position disengages the first guide 54 and the plate 42 from each other and disengages the second guide 55 and the plate 42 from each other, and in this state the first guide 54 and the second guide 55 are movable in the right and left direction.

As illustrated in FIG. 6, the second guide 55 includes the second guide portion 451, the second guide engagement portion 452, the second connecting portion 453, the second rack portion 454, and a second operation portion 59 which are formed integrally with each other.

Figure 8A:
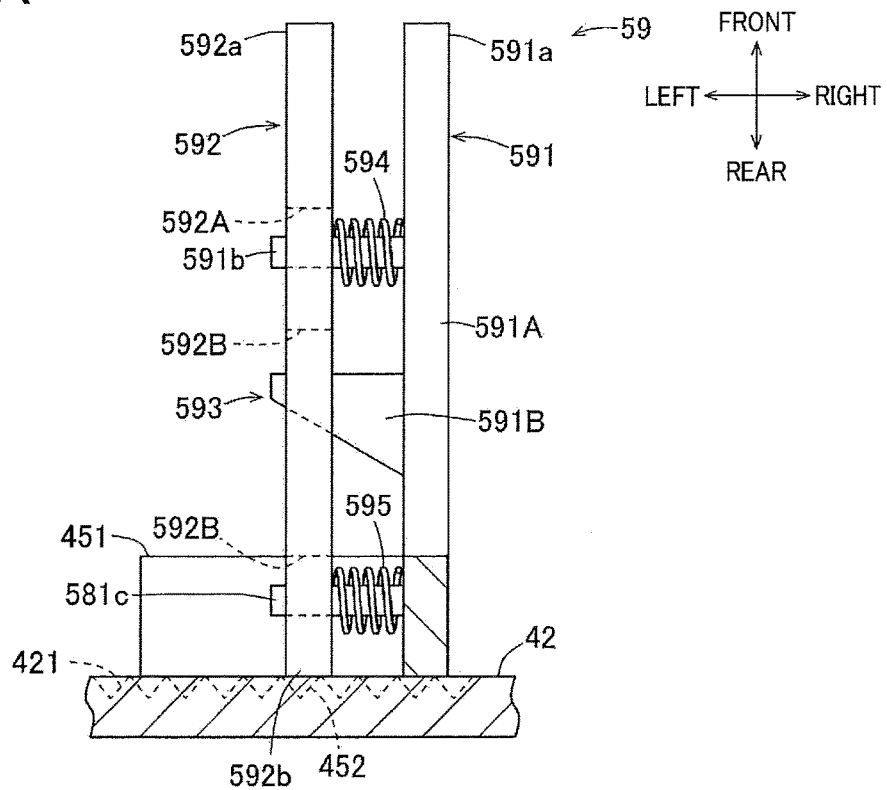
Figure 8B:
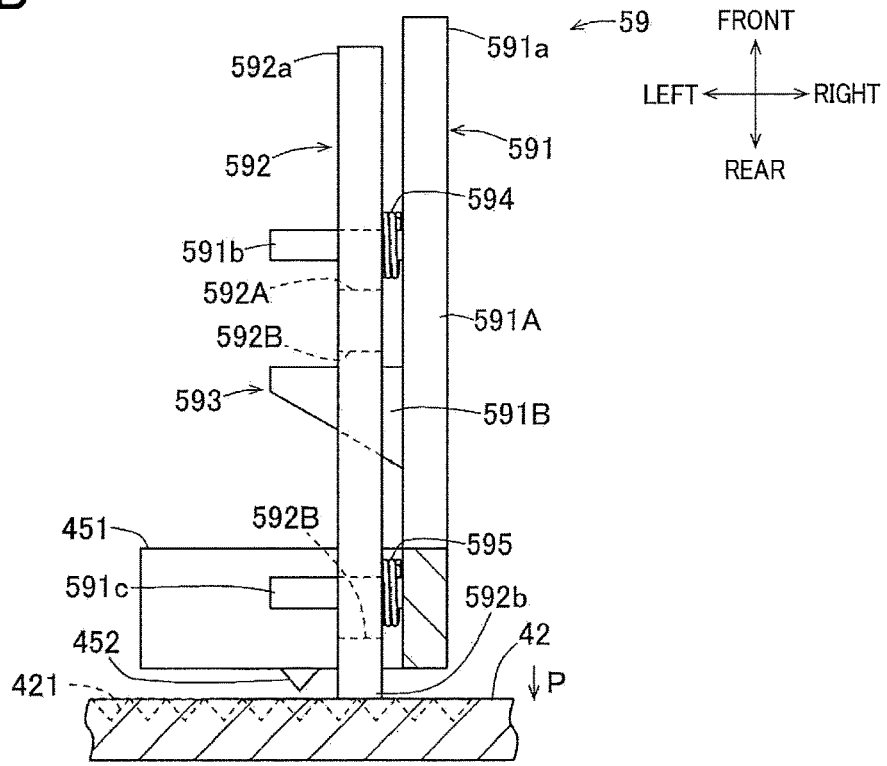

A second guide portion 551, the second guide engagement portion 452, and the second operation portion 59 of the second guide 55 in FIGS. 8A and 8B are symmetrical to the components of the first guide 54 in the right and left direction, and a detailed explanation thereof is dispensed with. FIG. 8A illustrates the second operation portion 59 located at a non-operated position. FIG. 8B illustrates the second operation portion 59 located at an operated position. It is noted that reference numerals corresponding to those of the components of the first operation portion 58 in FIGS. 7A and 7B are used for components of the second operation portion 59 in FIGS. 8A and 8B. The second operation portion 59 includes: a second support portion 591; a second moving portion 592 having a second guide contact portion 592b; a second sliding mechanism 593; and urging members 594, 595.

As illustrated in FIG. 8A, when the second operation portion 59 is located at the non-operated position, the plate 42 is located at the first position at which the second guide engagement portion 452 is in engagement with one of the engagement grooves 421. In this state, each of the urging members 594, 595 urges the second moving portion 592 in the left direction, and thereby no force acts on the second moving portion 592 in the front and rear direction, so that no force is applied from the second guide contact portion 592*b* to the plate 42. Since the plate 42 is urged frontward by the urging members 43, the front surface of the plate 42 is in contact with the second guide portion 451, and the second guide engagement portion 452 is in engagement with one of the engagement grooves 421. Thus, when the second operation portion 59 is located at the non-operated position, the second guide 55 is held in engagement with the plate 42.

As illustrated in FIG. 8B, when the second operation portion 59 is located at the operated position, the plate 42 is located at the second position at which the second guide engagement portion 452 is spaced apart from the engagement grooves 421. To move the second operation portion 59 to the operated position, the user pulls a knob 592*a* toward a knob 591*a* in a state in which the index finger of his or her right hand is placed on the knob 591*a*, and the thumb of the right hand is placed on the knob 592*a*, for example.

When the second operation portion 59 is moved from the non-operated position to the operated position, the knob 592*a* of the second moving portion 592 is moved in the rear right direction against the urging forces of the urging members 584, 585, which moves the second guide contact portion 592*b* in the rear right direction. In this movement, the second guide contact portion 592*b* pushes the front surface of the plate 42 rearward, so that the plate 42 is moved rearward as indicated by the arrow P in FIG. 8B against the urging forces of the urging members 43. This movement separates the second guide engagement portion 452 from the engagement groove 421. Thus, when the second operation portion 59 is located at the operated position, the second guide 55 and the plate 42 are disengaged from each other. At the same time, the first guide engagement portion 442 of the first guide 54 and the plate 42 are also disengaged from each other. Accordingly, the movement of the second operation portion 59 to the operated position disengages the second guide 55 and the plate 42 from each other and disengages the first guide 54 and the plate 42 from each other, and in this state the second guide 55 and the first guide 54 are movable in the right and left direction.

In view of the above, when at least one of the first operation portion 58 and the second operation portion 59 is located at the operated position, the first guide 54 and the plate 42 are disengaged from each other, the second guide 55 and the plate 42 are also disengaged from each other. Accordingly, when at least one of the first operation portion 58 and the second operation portion 59 is located at the operated position, the first guide 54 and the second guide 55 are movable in the right and left direction.

In the sheet tray 5 configured as described above, when each of the first operation portion 58 and the second operation portion 59 is located at the non-operated position, the plate 42 is located at the first position at which the first guide engagement portion 442 is in engagement with one of the engagement grooves 421, and the second guide engagement portion 452 is in engagement with one of the engagement grooves 421. On the other hand, when at least one of the first operation portion 58 and the second operation portion 59 is located at the operated position, the plate 42 is located at the second position at which the first guide engagement portion 442 is spaced apart from the engagement grooves 421, and the second guide engagement portion 452 is spaced apart from the engagement grooves 421.

With this configuration, when at least one of the first operation portion 58 and the second operation portion 59 is operated, the plate 42 engaged with the first guide 54 and the second guide 55 is moved to disengage the plate 42 and each of the first guide 54 and the second guide 55 from each other, thereby allowing the first guide 54 and the second guide 55 to move in the right and left direction. Accordingly, the user may operate any of the first operation portion 58 and the second operation portion 59 to move both of the first guide 54 and the second guide 55 to their respective desired positions, resulting in high usability.

Third Embodiment

Figure 9:
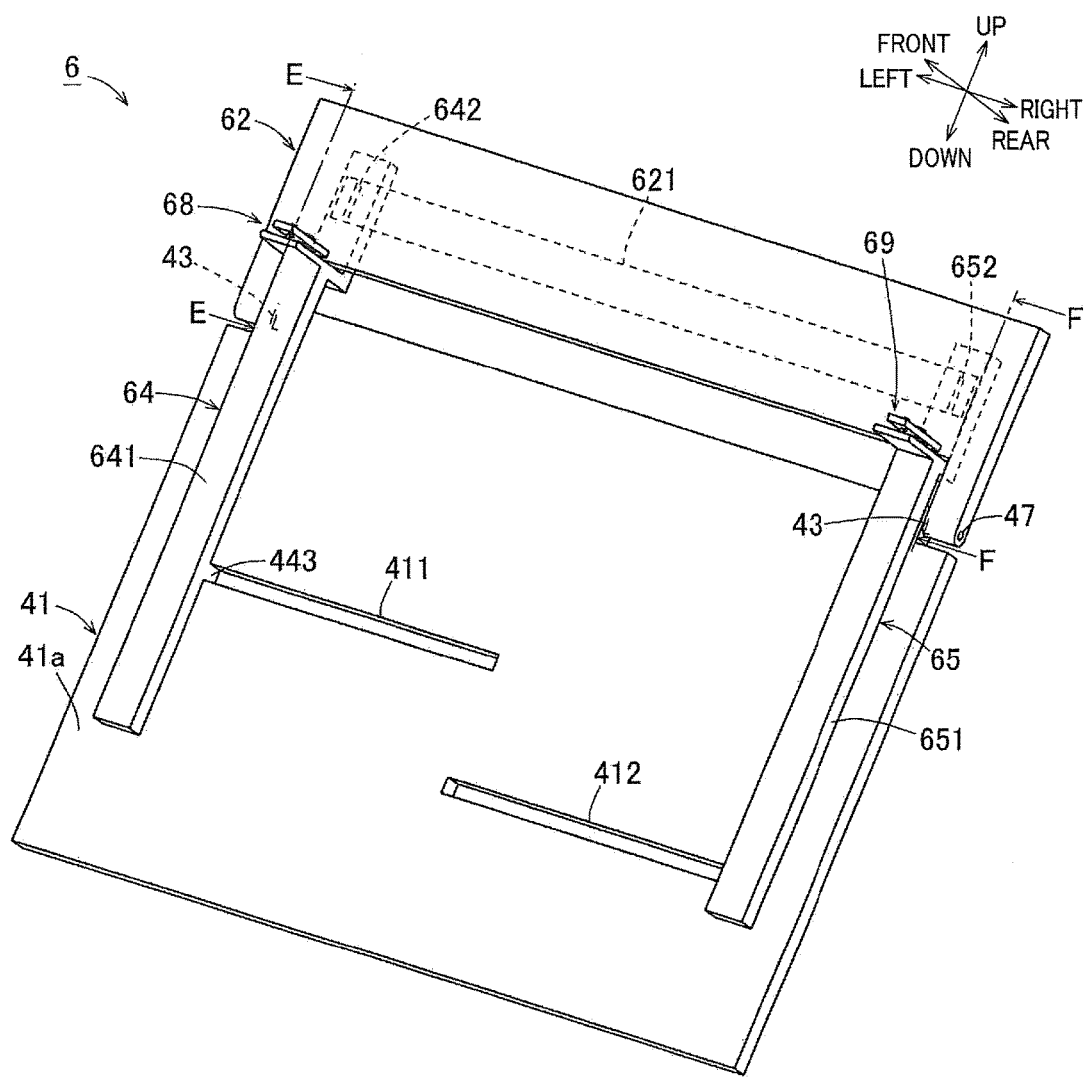
FIG. 9 is a perspective view of a sheet tray according to a third embodiment, illustrating a front side thereof.

FIG. 9 illustrates a front-side configuration of a sheet tray 6 according to a third embodiment. The rear-side configuration of the sheet tray 5 is similar to that of the sheet tray 4 according to the first embodiment (i.e., the rack and pinion), and illustration of the rear-side configuration of the sheet tray 6 is omitted. The following description is provided only for a difference between the sheet tray 6 according to the third embodiment and the sheet tray 5 according to the second embodiment. Also, the same reference numerals as used in the second embodiment are used to designate the corresponding elements of the third embodiment, and an explanation of which is dispensed with.

The sheet tray 6 includes the tray body 41, a plate 62, the urging members 43, a first guide 64, a second guide 65, and the interlocking mechanism 46.

The plate 62 is a substantially rectangular plate coupled to the upper end portion of the tray body 41. The front surface of the plate 42 is flush with the support surface 41*a* of the tray body 41 and supports the sheet or sheets with the support surface 41*a*.

The plate 62 is movably supported by the tray body 41. Specifically, the plate 62 and the tray body 41 are coupled to each other by the hinges 47. Each of the hinges 47 is constituted by (i) a pin provided on one of the plate 62 and the tray body 41 and (ii) a hole formed in the other of the plate 62 and the tray body 41, for example. This construction enables the plate 62 to pivot relative to the tray body 41 about an axis extending in the right and left direction.

A rear surface of the plate 62 has engagement grooves 621 as another example of the first plate engaging portion to be engaged with the first guide 64 and as another example of the second plate engaging portion to be engaged with the second guide 65. The engagement grooves 621 each extending in the up and down direction are arranged in the right and left direction. It is noted that engagement grooves as the first plate engaging portion for engagement with the first guide 64 and engagement grooves as the second plate engaging portion for engagement with the second guide 65 may be formed independently of each other. It is further noted that holes or protrusions may be used instead of the engagement grooves 621.

The first guide 64 is provided on the tray body 41 so as to be slidable in the widthwise direction. The first guide 64 is brought into contact with one edge of the sheet or sheets in the widthwise direction to position the sheet or sheets to the predetermined position. In the present embodiment, the first guide 64 is slidable in the right and left direction and brought into contact with the left edge of the sheet or sheets.

The first guide 64 includes a first guide portion 641, a first guide engagement portion 642, the first connecting portion 443, the first rack portion 444, and a first operation portion 68 which are formed integrally with each other.

The first guide portion 641 is brought into contact with the one edge of the sheet or sheets in the widthwise direction to position the sheet or sheets to the predetermined position. In the present embodiment, the first guide portion 641 is shaped like a bent bar extending in the up and down direction along the support surface 41a of the tray body 41 and the rear surface of the plate 62. The first guide engagement portion 642 is a protrusion formed near an upper end of the first guide portion 641 and engageable with any of the engagement grooves 621. When the first guide engagement portion 642 is held in engagement with one of the engagement grooves 621, the first guide 64 is positioned.

The first operation portion 68 is for moving the plate 62. In the present embodiment, the first operation portion 68 is moved away from a front surface of the plate 62 to turn the plate 62 in the front direction. FIG. 10A illustrates the first operation portion 68 located at a non-operated position. FIG. 10B illustrates the first operation portion 68 located at an operated position.

The first operation portion 68 includes: a first support portion 681; a first moving portion 682 having a first guide contact portion 682b; a first sliding mechanism 683; and urging members 684, 685.

The first support portion 681 includes: a first member 681A opposed to the front surface of the plate 42 and extending frontward from a front surface of the first guide portion 641; and a second member 681B extending upward from a middle portion of the first member 681A. The first member 681A and the second member 681B are formed integrally with each other. The second member 681B provided on the first member 681A is shaped like a substantially triangular prism. A rear surface of the second member 681B is inclined such that a lower portion of the front surface is located on a front side of an upper portion of the front surface. The second member 681B is one element of the first sliding mechanism 683. A front portion of the first member 681A serves as a knob 681a for an operation of the first operation portion 68.

The first moving portion 682 is shaped like a bar having three holes 682A, 682B, 682C each formed through the first moving portion 682 in the up and down direction and elongated in the front and rear direction. The hole 682B is one element of the first sliding mechanism 683. A portion of the first moving portion 682 which defines a front end of the hole 682B is inclined along an inclined surface of the second member 681B. When the second member 681B is inserted into the hole 682B, the inclined surfaces of the portion of the first moving portion 682 and the second member 681B are slid on each other. That is, the first moving portion 682 is slidable relative to the second member 681B. Specifically, the first moving portion 682 is movable toward the first member 681A in a state in which the first moving portion 682 and the first member 681A are parallel with each other.

A front portion of the first moving portion 682 serves as a knob 682a for an operation of the first operation portion 68. A rear end portion of the first moving portion 682 is the first guide contact portion 682b contactable with the front surface of the plate 62. The first guide contact portion 682b is in contact with the first plate contact portion of the plate 62. As illustrated in FIG. 9, the first plate contact portion is located between the hinges 47 and the engagement grooves 621 in the up and down direction. This configuration makes it possible to move the plate 62 so as to disengage the engagement groove 621 and the first guide engagement portion 642 from each other, by a small amount of movement of the first guide contact portion 682b in the front and rear direction.

The first sliding mechanism 683 is constituted by the second member 681B and the hole 682B. The first moving portion 682 is slidable by the first sliding mechanism 683 in the rear up direction and the front down direction. This embodiment uses the first sliding mechanism 683 for moving the first moving portion 682, whereby a small amount of operation for moving the first moving portion 682 is enough to move the plate 42 by a sufficient amount.

The urging members 684, 685 are provided between the first moving portion 682 and the first member 681A. Each of the urging members 684, 685 urges the first moving portion 682 in the up direction. Each of the urging members 684, 685 may be formed of any urging material such as a spring and rubber. In the present embodiment, the urging members 684, 685 are compression coil springs and respectively supported by protrusions 681b, 681c of the first member 681A. The protrusions 681b, 681c are inserted in the respective holes 682A, 682C of the first moving portion 682. Use of the urging members 684, 685 enables the plate 42 to be urged with a simple configuration. It is noted that at least one of the urging members 684, 685 is needed.

As illustrated in FIG. 10A, when the first operation portion 68 is located at the non-operated position, the plate 62 is located at the first position at which the first guide engagement portion 642 is in engagement with one of the engagement grooves 621. In this state, each of the urging members 684, 685 urges the first moving portion 682 in the up direction, whereby the first moving portion 682 is secured at a position spaced apart from the first member 681A, and the first guide contact portion 682b pushes the front surface of the plate 62. While the plate 62 is urged by the urging members 43 in the front direction, the urging force of the urging members 43 is less than a force by which the plate 62 is pushed by the first moving portion 682 and the second moving portion 692. Thus, the rear surface of the plate 62 is in contact with the first guide portion 641, and the first guide engagement portion 642 is held in engagement with one of the engagement grooves 621. Accordingly, when the first operation portion 68 is located at the non-operated position, the first guide 64 is held in engagement with the plate 62.

As illustrated in FIG. 10B, when the first operation portion 68 is located at the operated position, the plate 62 is located at the second position at which the first guide engagement portion 642 is spaced apart from the engagement grooves 621. To move the first operation portion 68 to the operated position, the user pulls the knob 682a toward the knob 681a in a state in which the thumb of his or her left hand is placed on the knob 681a, and the index finger of the left hand is placed on the knob 682a, for example.

When the first operation portion 68 is moved from the non-operated position to the operated position, the knob 682a of the first moving portion 682 is moved in the down direction against the urging forces of the urging members 684, 685, which moves the first guide contact portion 682b in the front down direction. That is, the first guide contact portion 682b is moved away from the front surface of the plate 62. As a result, the plate 62 is turned frontward as indicated by the arrow P in FIG. 10B by the urging forces of the urging members 43. This movement separates the first guide engagement portion 642 from the engagement groove 621. Thus, when the first operation portion 68 is located at the operated position, the first guide 64 and the plate 62 are disengaged from each other. At the same time, a second guide engagement portion 652 of the second guide 65 and the plate 62 are also disengaged from each other. Accordingly, the movement of the first operation portion 68 to the operated position disengages the first guide 64 and the plate 62 from each other and disengages the second guide 65 and the plate 62 from each other, and in this state the first guide 64 and the second guide 65 are movable in the right and left direction.

As illustrated in FIG. 9, the second guide 65 is provided on the tray body 41 so as to be slidable in the widthwise direction. The second guide 65 is brought into contact with the other edge of the sheet or sheets in the widthwise direction to position the sheet or sheets to the predetermined position. In the present embodiment, the second guide 65 is slidable in the right and left direction and brought into contact with the right edge of the sheet or sheets.

The second guide 65 includes a second guide portion 651, the second guide engagement portion 652, the second connecting portion 453, the second rack portion 454, and a second operation portion 69 which are formed integrally with each other.

The second guide portion 651, the second guide engagement portion 652, and the second operation portion 69 of the second guide 65 in FIGS. 11A and 11B are symmetrical to the components of the first guide 64 in the right and left direction, and a detailed explanation thereof is dispensed with. FIG. 11A illustrates the second operation portion 69 located at a non-operated position. FIG. 11B illustrates the second operation portion 69 located at an operated position. It is noted that reference numerals corresponding to those of the components of the first operation portion 68 in FIGS. 10A and 10B are used for components of the second operation portion 69 in FIGS. 11A and 11B. The second operation portion 69 includes: a second support portion 691; a second moving portion 692 having a second guide contact portion 692b; a second sliding mechanism 693; and urging members 694, 695.

As illustrated in FIG. 11A, when the second operation portion 59 is located at the non-operated position, the plate 62 is located at the first position at which the second guide engagement portion 652 is in engagement with one of the engagement grooves 621. In this state, each of the urging members 694, 695 urges the second moving portion 692 in the up direction, whereby the second moving portion 692 is secured at a position spaced apart from the first member 691A, and the second guide contact portion 692b pushes the front surface of the plate 62. While the plate 62 is urged by the urging members 43 in the front direction, the urging force of the urging members 43 is less than a force by which the plate 62 is pushed by the first moving portion 682 and the second moving portion 692. Thus, the rear surface of the plate 62 is in contact with the second guide portion 651, and the second guide engagement portion 652 is held in engagement with one of the engagement grooves 621. Accordingly, when the second operation portion 69 is located at the non-operated position, the second guide 65 is held in engagement with the plate 62.

As illustrated in FIG. 11B, when the second operation portion 69 is located at the operated position, the plate 62 is located at the second position at which the second guide engagement portion 652 is spaced apart from the engagement grooves 621. To move the second operation portion 69 to the operated position, the user pulls a knob 692a toward a knob 691a in a state in which the thumb of his or her right hand is placed on the knob 691a, and the index finger of the right hand is placed on the knob 692a.

When the second operation portion 69 is moved from the non-operated position to the operated position, the knob 692a of the second moving portion 692 is moved in the front down direction against the urging forces of the urging members 694, 695, which moves the second guide contact portion 692b in the front down direction. That is, the second guide contact portion 692b is moved away from the front surface of the plate 62. As a result, the plate 62 is turned frontward as indicated by the arrow P in FIG. 11B by the urging forces of the urging members 43. This movement separates the second guide engagement portion 652 from the engagement groove 621. Thus, when the second operation portion 69 is located at the operated position, the second guide 65 and the plate 62 are disengaged from each other. At the same time, the first guide engagement portion 642 of the first guide 64 and the plate 62 are also disengaged from each other. Accordingly, the movement of the second operation portion 69 to the operated position disengages the second guide 65 and the plate 62 from each other and disengages the first guide 64 and the plate 62 from each other, and in this state the second guide 65 and the first guide 64 are movable in the right and left direction.

In view of the above, when at least one of the first operation portion 68 and the second operation portion 69 is located at the operated position, the first guide 64 and the plate 62 are disengaged from each other, and the second guide 65 and the plate 62 are also disengaged from each other. Accordingly, when at least one of the first operation portion 68 and the second operation portion 69 is located at the operated position, the first guide 64 and the second guide 65 are movable in the right and left direction.

In the sheet tray 6 configured as described above, each of the first operation portion 68 and the second operation portion 69 is located at the non-operated position, the plate 62 is located at the first position at which the first guide engagement portion 642 is in engagement with one of the engagement grooves 621, and the second guide engagement portion 652 is in engagement with one of the engagement grooves 621. On the other hand, when at least one of the first operation portion 68 and the second operation portion 69 is located at the operated position, the plate 62 is located at the second position at which the first guide engagement portion 642 is spaced apart from the engagement grooves 621, and the second guide engagement portion 652 is spaced apart from the engagement grooves 621.

With this configuration, when at least one of the first operation portion 68 and the second operation portion 69 is operated, the plate 62 engaged with the first guide 64 and the second guide 65 is moved to disengage the plate 62 and each of the first guide 64 and the second guide 65 from each other, thereby allowing the first guide 64 and the second guide 65 to move in the right and left direction. Accordingly, the user may operate any of the first operation portion 68 and the second operation portion 69 to move both of the first guide 64 and the second guide 65 to their respective desired positions, resulting in high usability.

Fourth Embodiment

Figure 12:
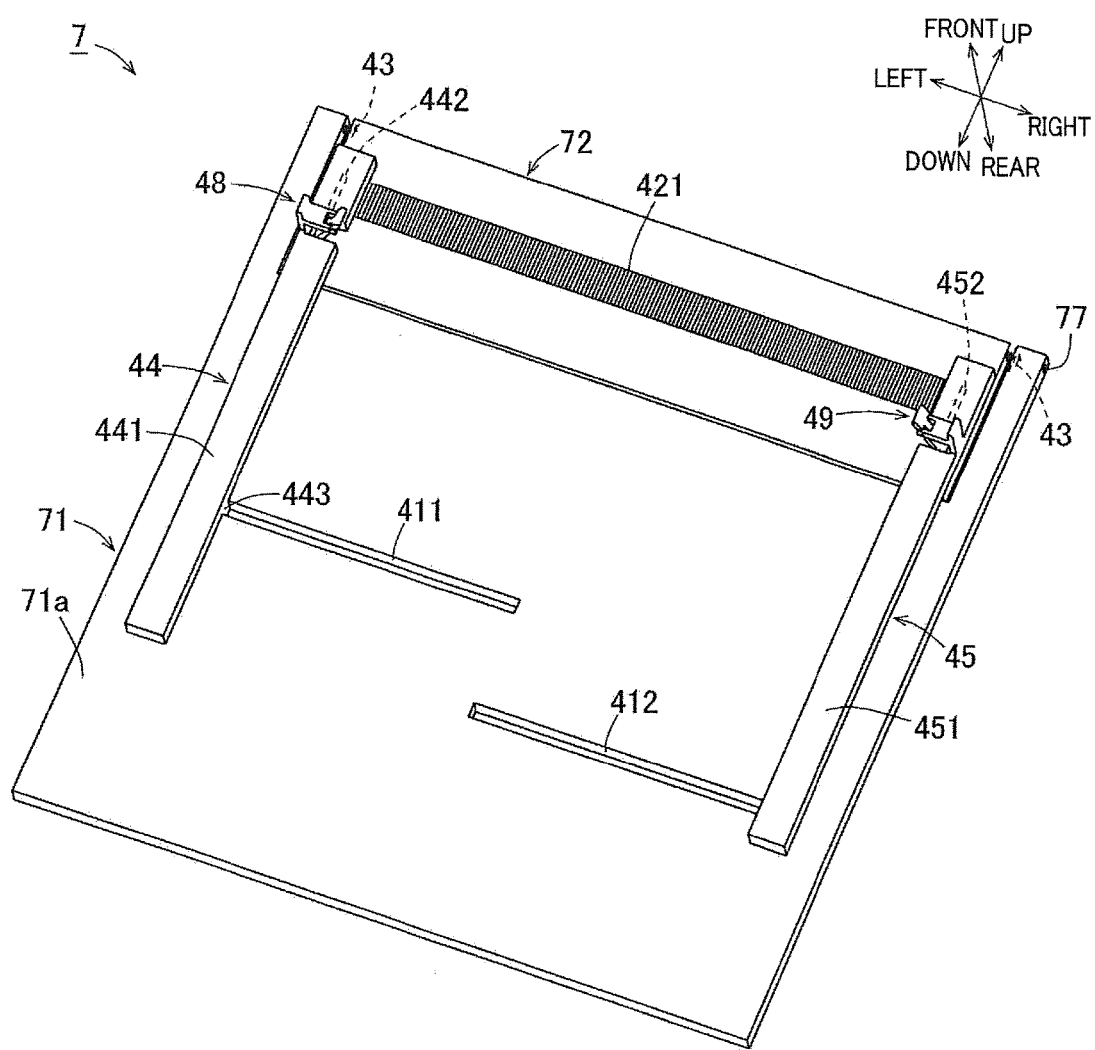
FIG. 12 is a perspective view of a sheet tray according to a fourth embodiment, illustrating a front side thereof.

FIG. 12 illustrates a front-side configuration of a sheet tray 7 according to a fourth embodiment. The following description is provided only for a difference between the sheet tray 7 according to the fourth embodiment and the sheet tray 4 according to the first embodiment. Also, the same reference numerals as used in the first embodiment are used to designate the corresponding elements of the fourth embodiment, and an explanation of which is dispensed with.

In the first embodiment, the plate 42 and the tray body 41 are coupled to each other by the hinges 47 as one example of the third hinge mechanism. In the fourth embodiment, in contrast, a plate 72 and a tray body 71 are coupled to each other by hinges 77 as another example of third hinge mechanism. The hinges 77 are the same as the hinges 47 in construction. That is, each of the hinges 77 is constituted by (i) a pin provided on one of the plate 72 and the tray body 71 and (ii) a hole formed in the other of the plate 72 and the tray body 71, for example. The hinges 77 are different from the hinges 47 in position and provided near an upper end portion of the sheet tray 7. Thus, the plate 72 is pivotable about an axis near the upper end portion of the sheet tray 7. Due to the positions of the hinges 77, the dimension of the plate 72 is less than that of the tray body 71 in the right and left direction. Right and left end portions of the tray body 71 extend respectively along right and left end portions of the plate 72. An upper end of the plate 72 and upper ends of the right and left end portions of the tray body 71 are the same as each other in position in the up and down direction.

With this configuration, as illustrated in FIG. 12, the first plate contact portion of the plate 72 which is in contact with the first guide contact portion 482b of the first operation portion 48 and a second plate contact portion of the plate 72 (a portion of the plate 72 at a second contact position) which is in contact with the second guide contact portion 492b of the second operation portion 49 are located farther from the hinges 77 than the engagement grooves 421 in the up and down direction. With this arrangement of the first plate contact portion and the second plate contact portion, the plate 72 can be moved using the principle of leverage even by a small operating force applied to the first operation portion 48 or the second operation portion 49.

That is, in the fourth embodiment, the first guide engagement portion 442 is located between the third hinge mechanism and the first plate contact portion of the plate 72 which is in contact with the first guide contact portion 482b, and the second guide engagement portion 452 is located between the third hinge mechanism and the second plate contact portion of the plate 72 which is in contact with the second guide contact portion 492b. As a result, a distance between the pivot center of the plate 72 and each of the first plate contact portion and the second plate contact portion is long. Thus, the engaged state of the plate 72 can be canceled using the principle of leverage by a small operating force applied to the first operation portion 48 or the second operation portion 49.

The present embodiment employs the first operation portion 48 and the second operation portion 49 used in the first embodiment but may employ the first operation portion 58 and the second operation portion 59 used in the second embodiment or the first operation portion 68 and the second operation portion 69 used in the third embodiment.

Fifth Embodiment

Figure 13:
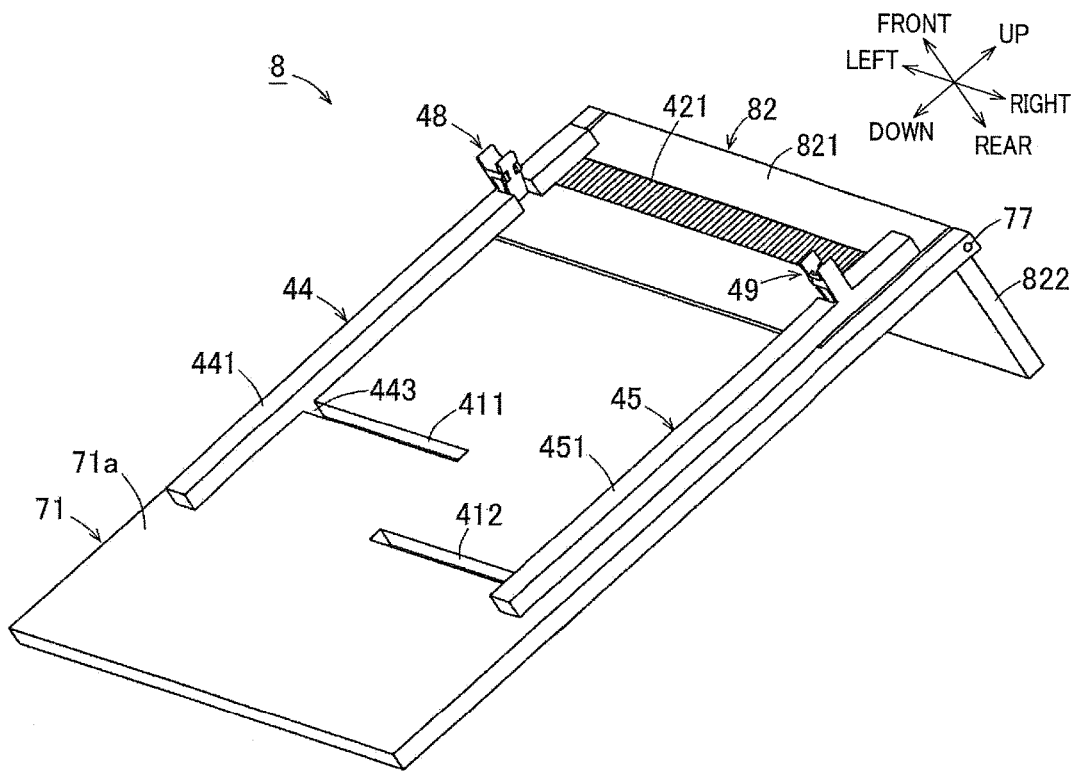
FIG. 13 is a perspective view of a sheet tray according to a fifth embodiment, illustrating a front side thereof.
Figure 14:
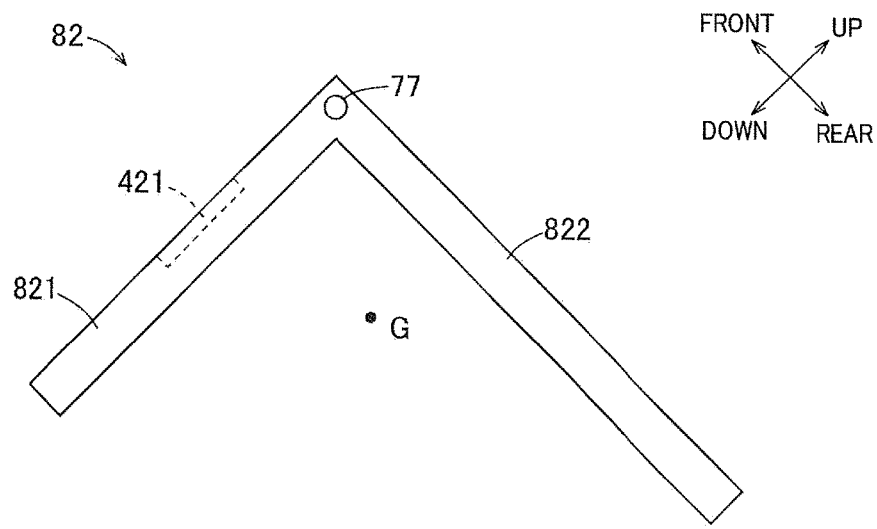
FIG. 14 is a right side view of a plate in the fifth embodiment.

FIG. 13 illustrates a sheet tray 8 according to a fifth embodiment. FIG. 14 illustrates a plate 82. The following description is provided only for a difference between the sheet tray 8 according to the fifth embodiment and the sheet tray 7 according to the fourth embodiment. Also, the same reference numerals as used in the fourth embodiment are used to designate the corresponding elements of the fifth embodiment, and an explanation of which is dispensed with.

The sheet tray 8 according to the fifth embodiment is different from the sheet tray 7 according to the fourth embodiment in that the plate 82 has an L-shape and that no urging members are attached to the hinges 77 in the fifth embodiment. As illustrated in FIG. 14, the plate 82 includes a first plate portion 821 extending in the up and down direction and a second plate portion 822 extending in the front and rear direction. The first plate portion 821 and the second plate portion 822 are formed integrally with each other so as to have an L-shape in side view. The first plate portion 821 and the second plate portion 822 have the same thickness and the same length in the right and left direction. The length of the second plate portion 822 in the front and rear direction is greater than that of the first plate portion 821 in the up and down direction. The hinges 77 are provided at an intersection of the first plate portion 821 and the second plate portion 822.

In a use state in which the sheet tray 8 is mounted on the image forming apparatus 1, as illustrated in FIG. 14, a center-of-gravity position G of the plate 82 is located on one of opposite sides of the hinges 77 which is nearer to the second plate portion 822. Thus, a rotation moment due to the weight of the plate 82 acts on the plate 82 in a direction in which the second plate portion 822 moves downward in the vertical direction. That is, the rotation moment is generated in the direction in which the second plate portion 822 rotates in the clockwise direction in FIG. 14. Thus, the plate 82 automatically pivots from the second position to the first position by the rotation moment generated by the weight of the plate 82. This configuration eliminates the need to use the urging member for urging the plate 82 from the second position to the first position.

It is noted that the plate used for the sheet tray 8 may have a configuration different from that of the plate 82 as long as a portion of the plate which is located on one side of the hinges 77 and which does not include the engagement grooves 421 is heavier than a portion of the plate which is located on the other side of the hinges 77 and which includes the engagement grooves 421. For example, a weight is provided on a portion of the plate which is located on one side of the hinges 77 and which does not include the engagement grooves 421.

That is, in the fifth embodiment, the center-of-gravity position at the first position of the plate is located on an opposite side of the pivot axis of the third hinge mechanism from the first plate engaging portion and the second plate engaging portion in the horizontal direction in a state in which the tray body 71 is disposed such that the sheet conveying direction on the tray body 71 coincides with an obliquely down direction.

Thus, in the case where the sheet tray is mounted on a rear surface of the image forming apparatus 1, appropriate design of the center-of-gravity position of the plate causes the plate to automatically pivot from the second position to the first position due to the rotation moment generated by the weight of the plate. This configuration eliminates the need to use the urging member for urging the plate.

The present embodiment employs the first operation portion 48 and the second operation portion 49 used in the first embodiment but may employ the first operation portion 58 and the second operation portion 59 used in the second embodiment.

Sixth Embodiment

Figure 15:
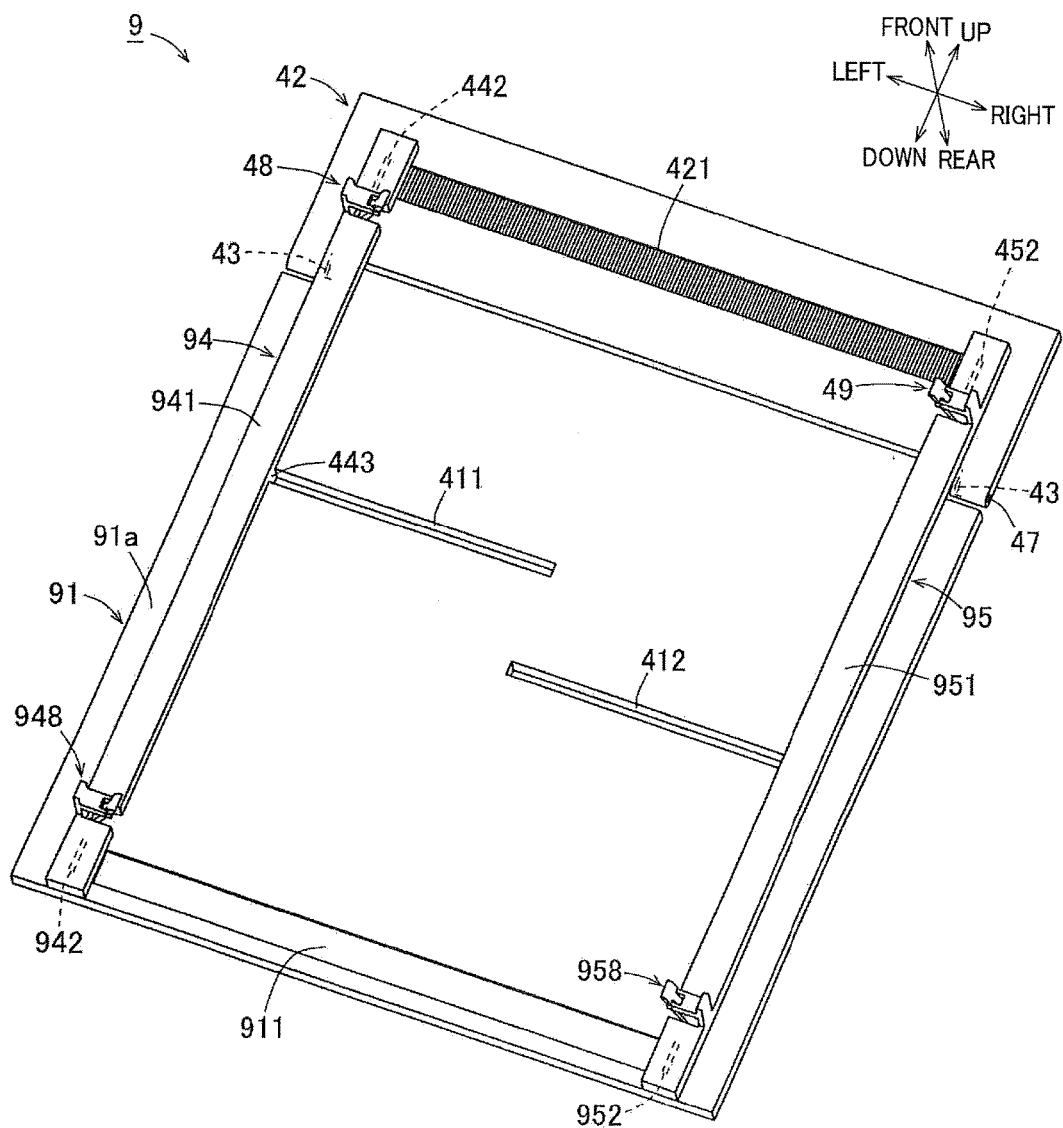
FIG. 15 is a perspective view of a sheet tray according to a sixth embodiment, illustrating a front side thereof.
Figure 16:
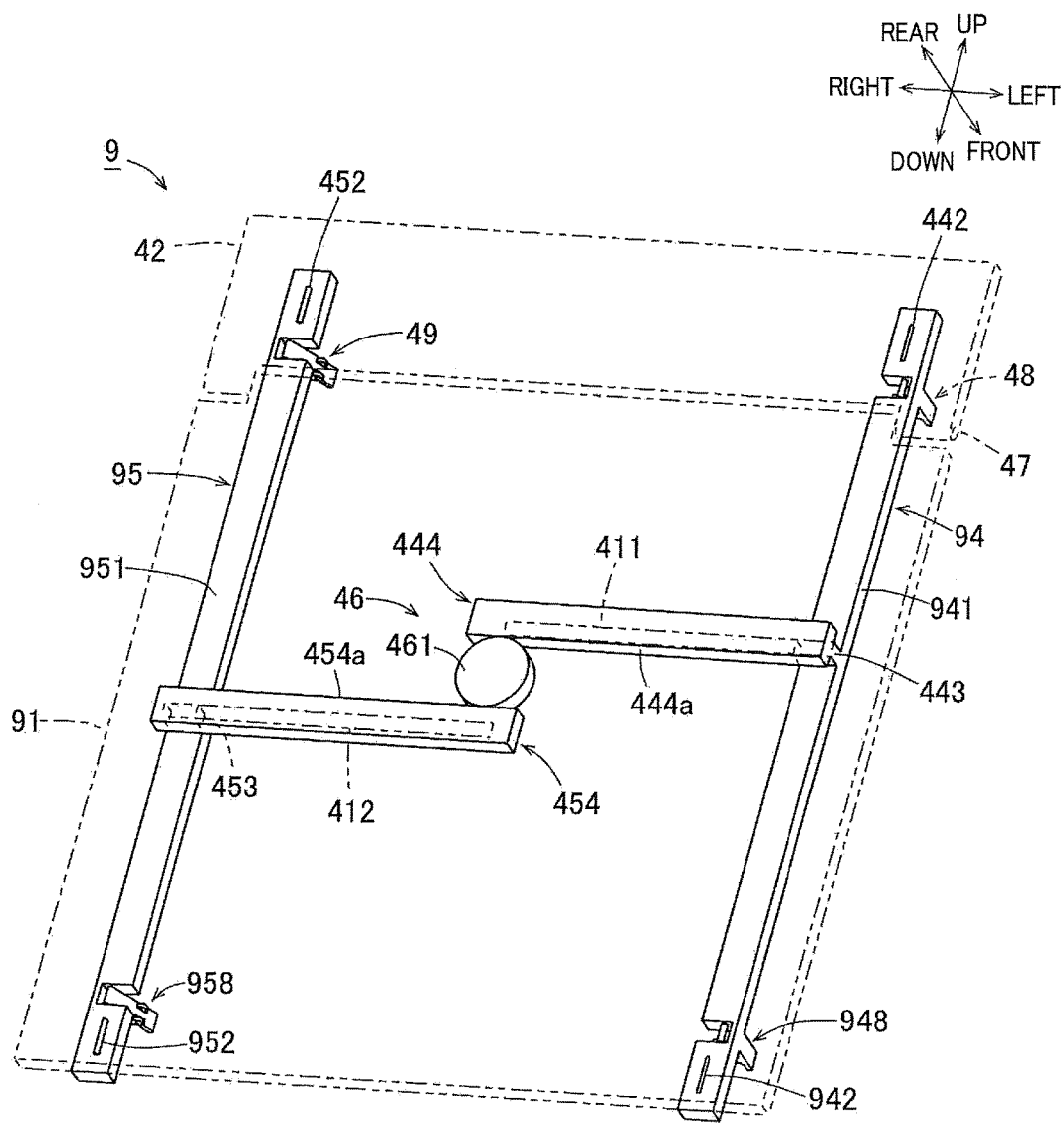
FIG. 16 is a perspective view of a sheet tray according to the sixth embodiment, illustrating a rear side thereof.

FIG. 15 illustrates a front-side configuration of a sheet tray 9 according to the sixth embodiment. FIG. 16 illustrates a rear-side configuration of the sheet tray 9 according to the sixth embodiment. The sheet tray 9 according to the sixth embodiment is configured such that the same component is used for a first guide 94 and a second guide 95. The following description is provided only for a difference between the sheet tray 9 according to the sixth embodiment and the sheet tray 4 according to the first embodiment. Also, the same reference numerals as used in the first embodiment are used to designate the corresponding elements of the sixth embodiment, and an explanation of which is dispensed with.

The sheet tray 9 according to the sixth embodiment is different from the sheet tray 4 according to the first embodiment in that a groove 911 is formed in a tray body 91, that the first guide 94 has a third guide engagement portion 942 and a third operation portion 948, and that the same component is used for the second guide 95 and the first guide 94.

As illustrated in FIG. 15, the groove 911 is formed in a front surface of the tray body 91 near a lower end portion thereof. The groove 911 has such a depth that the third guide engagement portion 942 and a fourth guide engagement portion 952 are not engaged with the groove 911.

The third operation portion 948 and the third guide engagement portion 942 are formed at a lower end portion of a first guide portion 941 of the first guide 94 so as to be symmetrical with the first operation portion 48 and the first guide engagement portion 442 with respect to a line that is parallel to the right and left direction and that extends through a center of the first guide portion 941 in the up and down direction. The same component is used for the third operation portion 948 and the first operation portion 48, and the same component is used for the third guide engagement portion 942 and the first guide engagement portion 442.

The second guide 95 has a shape formed by rotating the first guide 94 by 180 degrees along the front surface of the tray body 91. That is, the first guide 94 and the second guide 95 have the same shape and are arranged so as to be symmetrical with each other with respect to the center of rotation of the pinion gear 461. The second operation portion 49 of the second guide 95 corresponds to the third operation portion 948 of the first guide 94. The second guide engagement portion 452 of the second guide 95 corresponds to the third guide engagement portion 942 of the first guide 94.

A fourth operation portion 958 provided on a lower portion of the second guide 95 corresponds to the first operation portion 48 of the first guide 94. The fourth guide engagement portion 952 provided on the lower portion of the second guide 95 corresponds to the first guide engagement portion 442 of the first guide 94. As illustrated in FIG. 16, the second rack portion 454 of the second guide 95 corresponds to the first rack portion 444 of the first guide 94.

That is, in the sixth embodiment, the first guide 94 has the third guide engagement portion 942 and the third operation portion 948 located on an opposite side of the first rack portion 444 from the first guide engagement portion 442. The second guide 95 has a shape formed by rotating the first guide 94 by 180 degrees along a support surface 91a of the tray body 91 for supporting the sheet. The second guide engagement portion 452 corresponding to the third guide engagement portion 942 is engaged with one of the engagement grooves 421.

Since the first guide 94 has the third guide engagement portion 942 and the third operation portion 948, it is possible to provide commonality between the first guide 94 and the second guide 95, resulting in lower manufacturing cost and easier management of components.

Modifications

While the third hinge mechanism is used for pivotal movement of the plate in the above-described embodiments, the plate may be moved in different manners. For example, the plate may be translated instead of the pivotal movement.

The urging members 43 are attached to the hinges 47 or the hinges 77 in the above-described embodiments, but positions and form of the urging members 43 are not limited in particular as long as the urging members 43 urge the plate from the second position toward the first position. Thus, use of the urging member enables the plate to be kept at the first position with a simple configuration.

The present disclosure is applied to the sheet tray mounted on the rear surface of the image forming apparatus 1 in the above-described embodiments but may be applied to the sheet cassette 3 except the fifth embodiment.

Effects

The sheet tray 4 according to the first embodiment includes the tray body 41 capable of supporting the sheet or sheets. The sheet tray 4 includes the first guide 44 that is provided on the tray body 41 so as to be slidable in the widthwise direction and is brought into contact with one edge of the sheet or sheets in the widthwise direction to position the sheet or sheets to the predetermined position. The sheet tray 4 includes the second guide 45 that is provided on the tray body 41 so as to be slidable in the widthwise direction and is brought into contact with the other edge of the sheet or sheets in the widthwise direction to position the sheet or sheets to the predetermined position. The sheet tray 4 includes the interlocking mechanism 46 that enables the interlocked sliding operations of the first guide 44 and the second guide 45. The sheet tray 4 includes the plate 42 movably supported by the tray body 41 and having the engagement grooves 421 as the examples of the first plate engaging portion to be engaged with the first guide 44 and the second plate engaging portion to be engaged with the second guide 45. The first guide 44 includes: the first guide engagement portion 442 engageable with one of the engagement grooves 421; and the first operation portion 48 for moving the plate 42. The second guide 45 includes: the second guide engagement portion 452 engageable with one of the engagement grooves 421; and the second operation portion 49 for moving the plate 42. When each of the first operation portion 48 and the second operation portion 49 is located at the non-operated position, the plate 42 is located at the first position at which the first guide engagement portion 442 is in engagement with one of the engagement grooves 421, and the second guide engagement portion 452 is in engagement with one of the engagement grooves 421. When at least one of the first operation portion 48 and the second operation portion 49 is located at the operated position, the plate 42 is located at the second position at which the first guide engagement portion 442 is spaced apart from the engagement grooves 421, and the second guide engagement portion 452 is spaced apart from the engagement grooves 421.

With this configuration, when at least one of the first operation portion 48 and the second operation portion 49 is operated, the plate 42 engaged with the first guide 44 and the second guide 45 is moved to disengage the plate 42 and each of the first guide 44 and the second guide 45 from each other, thereby allowing the first guide 44 and the second guide 45 to slide. Accordingly, the user may operate any of the first operation portion 48 and the second operation portion 49 to slide both of the first guide 44 and the second guide 45 to their respective desired positions, resulting in high usability.

In the sheet tray 4 according to the first embodiment, the first operation portion 48 includes the first moving portion 482 having the first guide contact portion 482b that is in contact with the plate 42 when the first operation portion 48 is located at the operated position. The second operation portion 49 includes the second moving portion 492 having the second guide contact portion 492b that is in contact with the plate 42 when the second operation portion 49 is located at the operated position.

With this configuration, when the first moving portion 482 or the second moving portion 492 is operated, the first guide contact portion 482b or the second guide contact portion 492b contacts and pushes the plate 42 to turn the plate 42, so that its engaged state is canceled. That is, it is possible to achieve the first operation portion 48 and the second operation portion 49 with a simple configuration.

In the sheet tray 4 according to the first embodiment, the first operation portion 48 includes the hinge 483 as the first hinge mechanism which supports the first moving portion 482 pivotably. The second operation portion 49 includes the hinge 493 as the second hinge mechanism which supports the second moving portion 492 pivotably.

That is, the hinge mechanisms are used for moving the first moving portion 482 and the second moving portion 492. This configuration facilitates designing.

In the sheet tray 5 according to the second embodiment, the first operation portion 58 includes the first sliding mechanism 583 that supports the first moving portion 582 slidably, and the second operation portion 59 includes the second sliding mechanism 593 that supports the second moving portion 592 slidably.

Sliding mechanisms are used for moving the first moving portion 582 and the second moving portion 592, resulting in reduced amount of operation for moving the first moving portion 582 and the second moving portion 592.

In the sheet tray 4 according to the first embodiment, the plate 42 and the tray body 41 are coupled to each other by the hinges 47 as the third hinge mechanism.

The configuration using the hinge mechanism for moving the plate 42 facilitates designing.

In the sheet tray 4 according to the first embodiment, the first plate contact portion of the plate 42 which is in contact with the first guide contact portion 482b is located between the hinges 47 and the first guide engagement portion 442, and the second plate contact portion of the plate 42 which is in contact with the second guide contact portion 492b is located between the hinges 47 and the second guide engagement portion 452.

This configuration can cancel the engaged state of the plate 42 with a small amount of operation of the first operation portion 48 or the second operation portion 49.

In the sheet tray 7 according to the fourth embodiment, the first guide engagement portion 442 is located between the hinges 77 as the third hinge mechanism and the first plate contact portion of the plate 42 which is in contact with the first guide contact portion 482b, and the second guide engagement portion 452 is located between the hinges 77 and the second plate contact portion of the plate 42 which is in contact with the second guide contact portion 492b.

With this configuration, the engaged state of the plate 42 can be canceled using the principle of leverage by the small operating force applied to the first operation portion 48 or the second operation portion 49.

In the sheet tray 8 according to the fifth embodiment, the center-of-gravity position G at the first position of the plate is located on an opposite side of the pivot axis of the hinges 77 from the engagement grooves 421 in the horizontal direction in the state in which the tray body 71 is disposed such that the sheet conveying direction on the tray body 71 coincides with the obliquely down direction.

With this configuration, in the case where the sheet tray 8 is a multi-purpose tray mounted on the image forming apparatus, appropriate design of the center-of-gravity position of the plate 82 causes the plate 82 to automatically pivot from the second position to the first position due to the rotation moment generated by the weight of the plate 82. This configuration eliminates the need to use the urging member for urging the plate 82.

In the sheet tray 4 according to the first embodiment, the urging members 43 are provided to urge the plate 42 from the second position toward the first position.

With this configuration, the plate 42 can be kept at the first position by a simple configuration using the urging members 43.

In the sheet tray 4 according to the first embodiment, the interlocking mechanism 46 includes: the pinion gear 461 provided on the tray body 41; the first rack gear 444a provided on the first guide 44 and engaged with the pinion gear 461; and the second rack gear 454a provided on the second guide 45 and engaged with the pinion gear 461.

That is, it is possible to achieve the interlocking mechanism 46 with a simple configuration.

In the sheet tray 9 according to the sixth embodiment, the first guide 94 has the third guide engagement portion 942 and the third operation portion 948 located on an opposite side of the first rack gear 444a from the first guide engagement portion 442. The second guide 95 has a shape formed by rotating the first guide 94 by 180 degrees along the support surface 91a of the tray body 91 for supporting the sheet. The second guide engagement portion 452 of the second guide 95 which corresponds to the third guide engagement portion 942 of the first guide 94 is engaged with one of the engagement grooves 421.

Since the first guide 94 has the third guide engagement portion 942 and the third operation portion 948, it is possible to provide commonality between the first guide 94 and the second guide 95, resulting in lower manufacturing cost and easier management of components.

What is claimed is:
1. A sheet tray, comprising:
a tray body configured to support a sheet;
a first guide provided on the tray body so as to be slidable in a widthwise direction orthogonal to a sheet conveying direction in which the sheet is to be conveyed, the first guide being contactable with a first edge portion of the sheet in the widthwise direction to position the sheet;
a second guide provided on the tray body so as to be slidable in the widthwise direction and contactable with a second edge portion of the sheet in the widthwise direction to position the sheet;
an interlocking mechanism configured to interlock sliding operations of the first guide and the second guide; and
a plate movably supported by the tray body and comprising (i) a first plate engaging portion to be engaged with the first guide and (ii) a second plate engaging portion to be engaged with the second guide,
wherein the first guide comprises: a first guide engagement portion to be engaged with the first plate engaging portion; and a first operation portion configured to move the plate,
wherein the second guide comprises: a second guide engagement portion to be engaged with the second plate engaging portion; and a second operation portion configured to move the plate,
wherein when each of the first operation portion and the second operation portion is located at a non-operated position, the plate is located at a first position at which the first plate engaging portion is engaged with the first guide engagement portion, and the second plate engaging portion is engaged with the second guide engagement portion, and wherein when at least one of the first operation portion and the second operation portion is located at an operated position, the plate is located at a second position at which the first plate engaging portion is spaced apart from the first guide engagement portion, and the second plate engaging portion is spaced apart from the second guide engagement portion.

2. The sheet tray according to claim 1, wherein the first operation portion comprises a first moving portion comprising a first guide contact portion being in contact with the plate when the first operation portion is located at the operated position, and wherein the second operation portion comprises a second moving portion comprising a second guide contact portion being in contact with the plate when the second operation portion is located at the operated position.

3. The sheet tray according to claim 2, wherein the first operation portion comprises a first hinge mechanism supporting the first moving portion such that the first moving portion is pivotable, and wherein the second operation portion comprises a second hinge mechanism supporting the second moving portion such that the second moving portion is pivotable.

4. The sheet tray according to claim 2, wherein the first operation portion comprises a first sliding mechanism supporting the first moving portion such that the first moving portion is slidable, and wherein the second operation portion comprises a second sliding mechanism supporting the second moving portion such that the second moving portion is slidable.

5. The sheet tray according to claim 4, further comprising a third hinge mechanism coupling the plate and the tray body to each other.

6. The sheet tray according to claim 5, wherein the plate is configured to pivot relative to the tray body about a pivot axis via the third hinge mechanism, and wherein a direction of the pivot axis substantially coincides with a direction of a line connecting between a position at which the first guide engagement portion and the first plate engaging portion are engaged with each other and a position at which the second guide engagement portion and the second plate engaging portion are engaged with each other.

7. The sheet tray according to claim 5, wherein the plate comprises a first plate contact portion that is a portion of the plate which is contacting the first guide contact portion of the first guide, and the first plate contact portion is located between the third hinge mechanism and the first guide engagement portion, and wherein the plate comprises a second plate contact portion that is a portion of the plate which is contacting the second guide contact portion of the second guide, and the second plate contact portion is located between the third hinge mechanism and the second guide engagement portion.

8. The sheet tray according to claim 5, wherein the first guide engagement portion is located between the third hinge mechanism and a first plate contact portion of the plate which is contactable with the first guide contact portion of the first guide, and wherein the second guide engagement portion is located between the third hinge mechanism and a second plate contact portion of the plate which is contactable with the second guide contact portion of the second guide.

9. The sheet tray according to claim 5, wherein a center-of-gravity position of the plate located at the first position is located on an opposite side of the first plate engaging portion and the second plate engaging portion from a pivot axis of the third hinge mechanism in a horizontal direction in a state in which the tray body is disposed such that the sheet conveying direction on the tray body coincides with an obliquely down direction.

10. The sheet tray according to claim 1, further comprising an urging member configured to urge the plate from the second position toward the first position.

11. The sheet tray according to claim 1, wherein the interlocking mechanism comprises:

a pinion gear provided on the tray body;

a first rack provided on the first guide and engaged with the pinion gear; and a second rack provided on the second guide and engaged with the pinion gear.

12. The sheet tray according to claim 11, wherein the first guide comprises a third guide engagement portion and a third operation portion located on an opposite side of the first rack from the first guide engagement portion, and wherein the second guide is a guide obtained by rotating the first guide such that the third guide engagement portion serves as the second guide engagement portion to be engaged with the second plate engaging portion, and that the first rack serves as the second rack to be engaged with the pinion gear.

13. An image forming apparatus, comprising:

a sheet tray; and an image forming device configured to form an image on a sheet, wherein the sheet tray comprises:

a tray body configured to support the sheet;

a first guide provided on the tray body so as to be slidable in a widthwise direction orthogonal to a sheet conveying direction in which the sheet is to be conveyed, the first guide being contactable with a first edge portion of the sheet in the widthwise direction to position the sheet;

a second guide provided on the tray body so as to be slidable in the widthwise direction and contactable with a second edge portion of the sheet in the widthwise direction to position the sheet;

an interlocking mechanism configured to interlock sliding operations of the first guide and the second guide; and a plate movably supported by the tray body and comprising (i) a first plate engaging portion to be engaged with the first guide and (ii) a second plate engaging portion to be engaged with the second guide, wherein the first guide comprises: a first guide engagement portion to be engaged with the first plate engaging portion; and a first operation portion configured to move the plate, wherein the second guide comprises: a second guide engagement portion to be engaged with the second plate engaging portion; and a second operation portion configured to move the plate, wherein when each of the first operation portion and the second operation portion is located at a non-operated position, the plate is located at a first position at which the first plate engaging portion is engaged with the first guide engagement portion, and the second plate engaging portion is engaged with the second guide engagement portion, and wherein when at least one of the first operation portion and the second operation portion is located at an operated position, the plate is located at a second position at which the first plate engaging portion is spaced apart from the first guide engagement portion, and the second plate engaging portion is spaced apart from the second guide engagement portion.

* * * * *